US011115545B2

(12) United States Patent (10) Patent No.: US 11,115,545 B2
Sensu et al. (45) Date of Patent: Sep. 7, 2021

(54) IMAGE FORMING APPARATUS AND METHOD OF INFORMATION DISPLAY

(71) Applicant: Sharp Kabushiki Kaisha, Osaka (JP)

(72) Inventors: Minami Sensu, Osaka (JP); Toshihiro Shoji, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 1598 days.

(21) Appl. No.: 14/818,371

(22) Filed: Aug. 5, 2015

(65) Prior Publication Data

US 2015/0341508 A1 Nov. 26, 2015

Related U.S. Application Data

(63) Continuation of application No. 13/187,822, filed on Jul. 21, 2011, now Pat. No. 9,148,535.

(30) Foreign Application Priority Data

Jul. 22, 2010 (JP) .............................. JP2010-164406

(51) Int. Cl.
*G06F 15/00* (2006.01)
*H04N 1/00* (2006.01)
*G06F 3/0484* (2013.01)
*G06F 3/0481* (2013.01)
(Continued)

(52) U.S. Cl.
CPC ....... *H04N 1/0044* (2013.01); *G06F 3/04817* (2013.01); *G06F 3/04842* (2013.01); *G06F 40/106* (2020.01); *G06F 40/166* (2020.01); *H04N 1/00482* (2013.01); *H04N 1/0049* (2013.01); *H04N 1/00411* (2013.01); *H04N 1/00448* (2013.01); *H04N 1/00453* (2013.01); *H04N 1/00456* (2013.01); *H04N 1/00474* (2013.01); *H04N 1/00896* (2013.01);
(Continued)

(58) Field of Classification Search
CPC ............. H04N 1/0044; H04N 1/00482; H04N 1/00896; G06F 3/04817; G06F 17/24; G06F 17/212; G06F 3/04842
See application file for complete search history.

(56) References Cited

U.S. PATENT DOCUMENTS

| | | | |
|---|---|---|---|
| 2005/0094208 A1* | 5/2005 | Mori | ...................... G06F 17/211 358/1.18 |
| 2010/0149590 A1* | 6/2010 | Nishiyama | ......... H04N 1/00347 358/1.15 |
| 2011/0258571 A1* | 10/2011 | Kodimer | ............... G06F 3/0482 715/771 |

OTHER PUBLICATIONS

Sensu et al., "Image Forming Apparatus and Method of Information Display", U.S. Appl. No. 13/187,822, filed Jul. 21, 2011.

* cited by examiner

*Primary Examiner* — Helen Zong
(74) *Attorney, Agent, or Firm* — Keating & Bennett, LLP

(57) ABSTRACT

An image forming apparatus includes a display having a function of editing input image data and a function of displaying page images immediately after reading in order. When a first type of instruction to change shape of an image formed on a recording medium is given, the edition is not reflected on a document display mode screen image, and when a second type of instruction to edit page by page the recording medium having images formed thereon is given, the edition is reflected on the document display mode screen image. By switching between a finish preview screen image and the document display mode screen image, the image after edition and the image immediately after reading can be compared easily.

6 Claims, 20 Drawing Sheets

(51) Int. Cl.
*G06F 40/106* (2020.01)
*G06F 40/166* (2020.01)
(52) U.S. Cl.
CPC .............. *H04N 2201/0094* (2013.01); *H04N 2201/0098* (2013.01)

FIG. 13
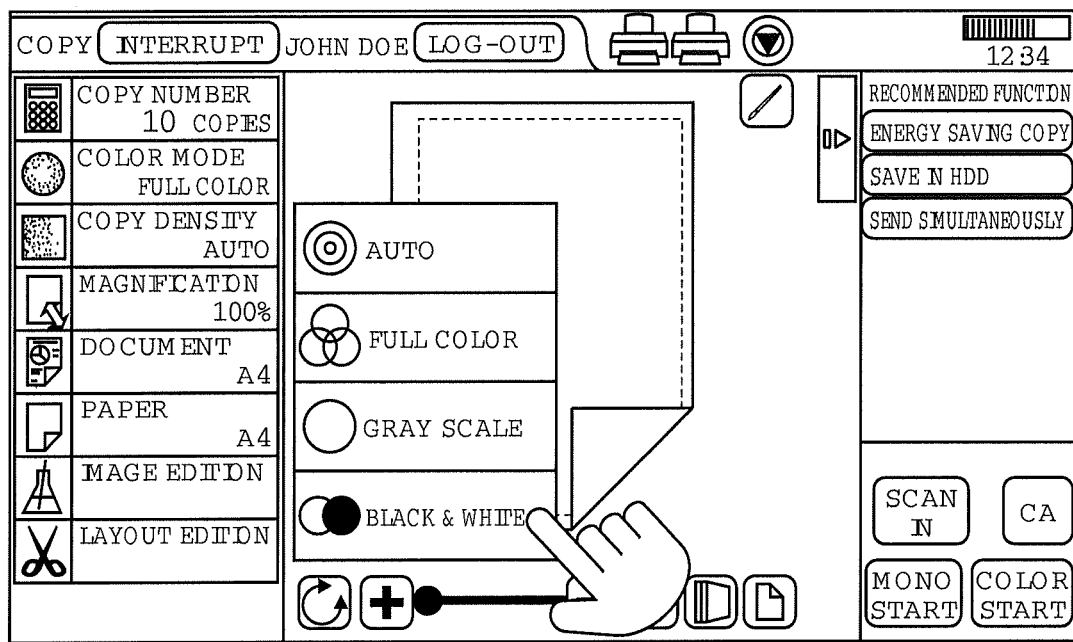
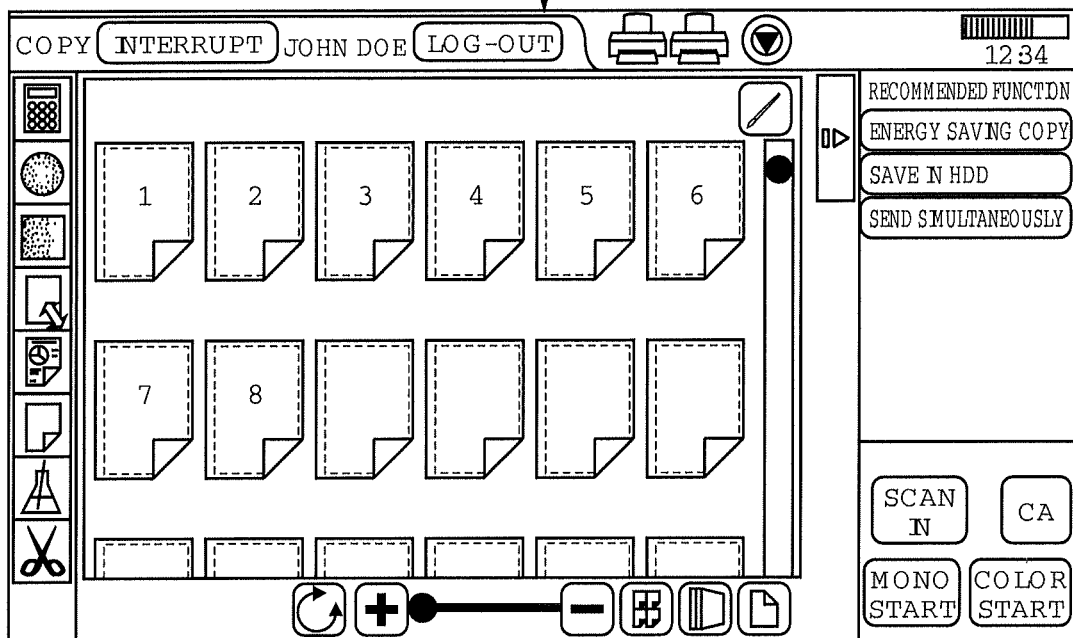

FIG 15
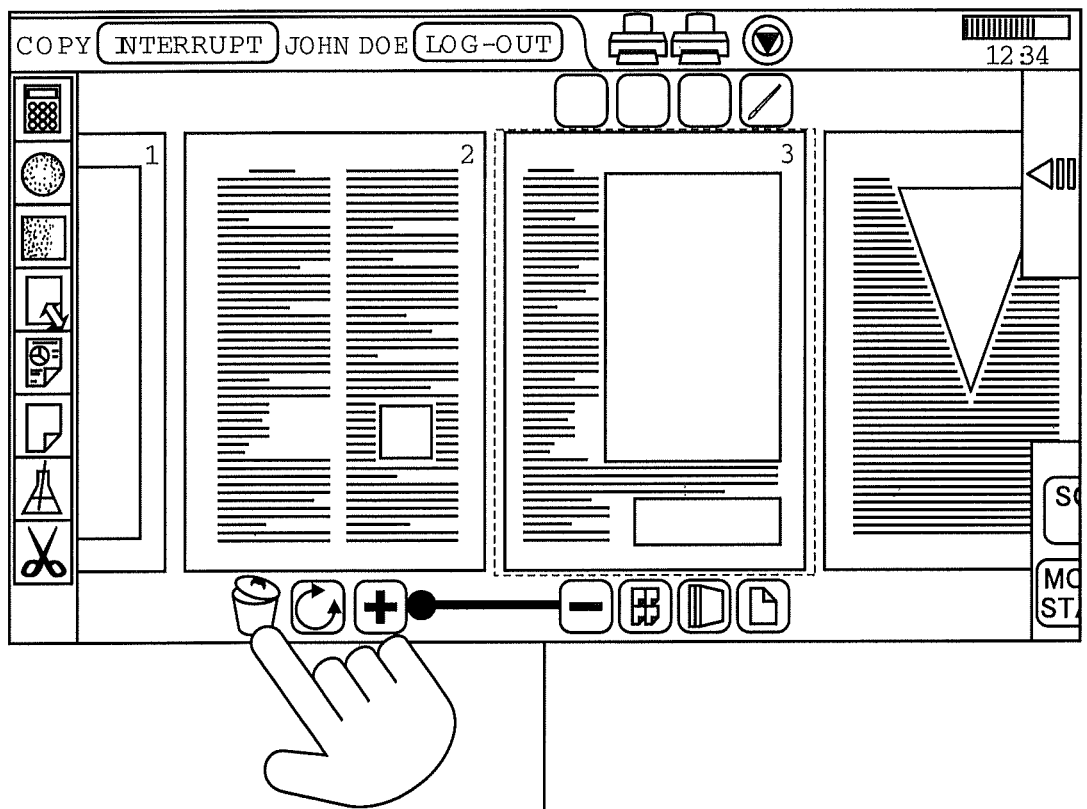
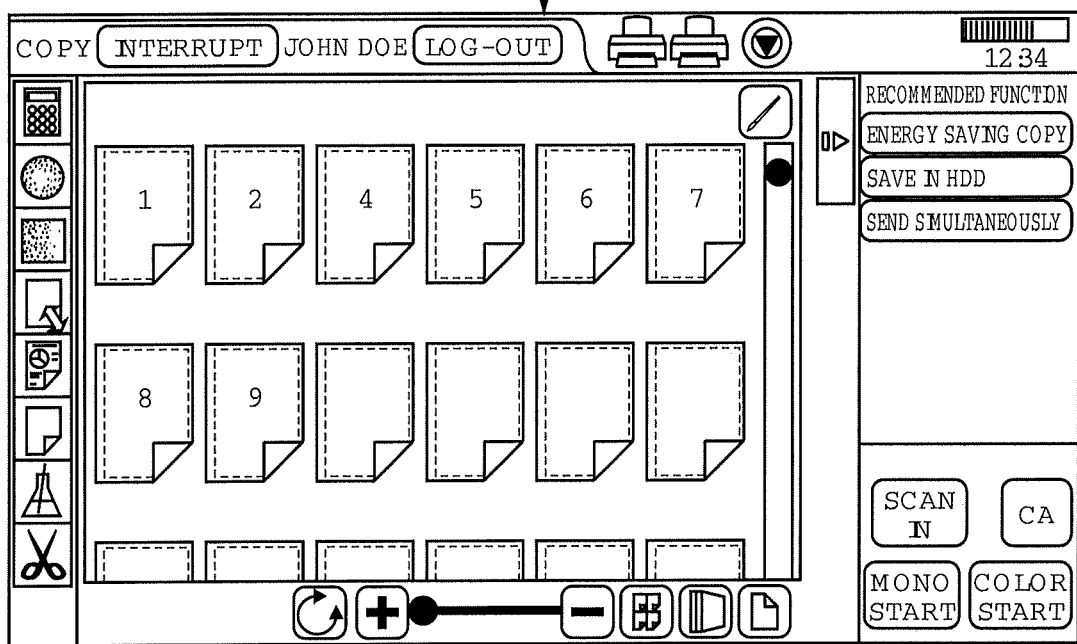

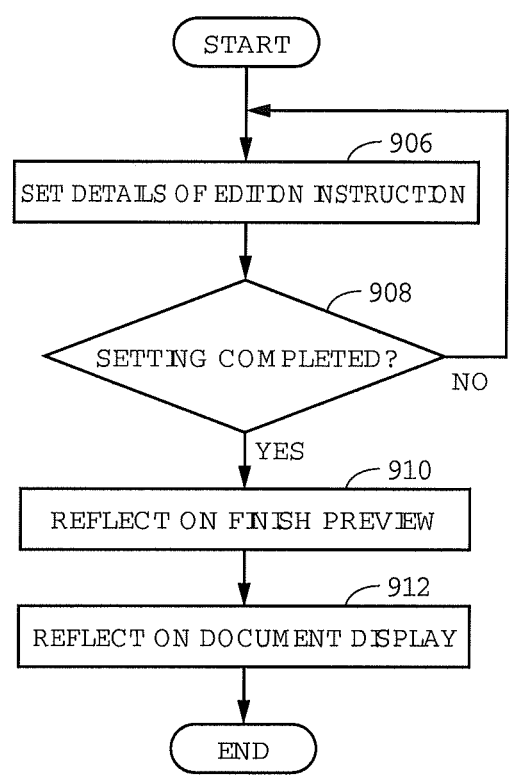

IMAGE FORMING APPARATUS AND METHOD OF INFORMATION DISPLAY

CROSS-REFERENCE TO RELATED APPLICATION

This nonprovisional application claims priority under 35 U.S.C. § 119(a) on Patent Application No. 2010-164406 filed in Japan on Jul. 22, 2010, the entire contents of which are hereby incorporated by reference.

BACKGROUND OF THE INVENTION

Field of the Invention

The present invention relates to an image forming apparatus and, more specifically, to an image forming apparatus allowing the user to understand how page images change by an editing work.

Description of the Background Art

As one type of image processing apparatuses as electronic equipment, image forming apparatuses (typically, copy machines) are introduced to many places of business (companies and offices). A main function of an image forming apparatus is to form an image on a sheet of recording paper. Therefore, it is often the case that the image forming apparatus has a printer function, a copy function and the like. The image forming apparatuses are often connected to a network, to allow use by a plurality of users. A multifunction peripheral (MFP) has been known as one type of such image forming apparatuses. An MFP has a scanner function, and has a plurality of basic operational modes such as a copy mode, a facsimile mode (hereinafter "facsimile" may also be denoted as FAX or fax), and a network-supported printer mode. It is expected that the scanner function will be used more frequently in the future in such image forming apparatuses. In the copy mode and facsimile mode also, it is possible to read an image using the scanner function and to set functions such as duplex (two-sided) printing, collective printing (such as 2-in-1 by which two pages of an original document are printed on one sheet, or 4-in-1 by which four pages of an original document are printed on one sheet), and enlargement or reduction of size.

When using such an image forming apparatus, by way of example, the user makes the following operations. First, the user has image data read by the image forming apparatus in the scanner mode. Thereafter, the user inputs various instructions through an operation panel, and performs image processing (such as collection). Then, the user gives an instruction to start a final processing of the image (printing to a sheet of paper, transmission by facsimile, and saving as a file). A screen image allowing setting of functions in various operational modes, for example, is displayed on the operation panel. Therefore, it is possible for the user to easily set various functions.

It is possible for the user to use various functions to edit image data in various manners. When many functions are combined, however, resulting output document may possibly have a configuration much different from the original image data. In such a case, it has been impossible for the user to know how the edited image data would be output, until the document is actually printed. If the configuration of the output document is found to be different from the document configuration intended by the user, it is often the case that toner and paper used for image formation are wasted.

Therefor, some image forming apparatuses have a preview display function of showing how the edited image will be output. By way of example, Japanese Patent Laying-Open No. 2008-203439 (hereinafter referred to as '439 Reference) discloses a technique allowing confirmation of a finish of an image of a plurality of pages by a preview display. Japanese Patent Laying-Open No. 2007-110677 (hereinafter referred to as '677 Reference) discloses a technique enabling quick display of a target page from images of a plurality of pages. Further, Japanese Patent Laying-Open No. 2009-253777 (hereinafter referred to as '777 Reference) discloses a technique of giving animation display of a transition process from a displayed preview image to a target preview image.

The techniques disclosed in '439, '677 and '777 References are all related to the preview display of page image after the image has been subjected to editing operations. Therefore, it has been impossible for the user to grasp what page images constitute the original document image, or how the configuration changes by the editing operations.

SUMMARY OF THE INVENTION

In view of the problem described above, it is desirable to provide an image forming apparatus and a method of information display, forming two different displays reflecting and not reflecting contents of edition on a page image depending on the contents of edition instruction, and thereby allowing the user to understand how the page image changes by the edition.

The present invention provides an image forming apparatus, including: an input unit for inputting image data; a generating unit generating a page image from the image data input by the input unit; a display unit displaying the page image, page by page in order; and an edition instructing unit instructing edition of the image data page by page. The image forming apparatus further includes an image editing unit, not reflecting the edition if the edition instruction given by the edition instructing unit is a first type of edition instruction, and reflecting the edition on the page image on the display unit if the edition instruction given by the edition instructing unit is a second type of edition instruction. The first type of edition instruction is an instruction to change a shape of an image formed on a recording medium based on the image data, and the second type of edition instruction is an instruction to edit, page by page, the recording medium on which an image has been formed based on the image data.

The present invention provides a method of displaying information in an image forming apparatus including a display unit for displaying an image, including the steps of: inputting image data; generating a page image from the input image data; displaying the page image, page by page in order on the display unit; and instructing edition of the image data page by page. The method further includes the step of not reflecting the edition on the page image on the display unit if the given edition instruction is a first type of edition instruction, and reflecting the edition on the page image on the display unit if the given edition instruction is a second type of edition instruction. The first type of edition instruction is an instruction to change a shape of an image formed on a recording medium based on the image data, and the second type of edition instruction is an instruction to edit, page by page, the recording medium on which an image has been formed based on the image data.

Preferably, the first type of edition instruction is one of or an arbitrary combination of the following edition instructions. (1) An edition instruction to form images of a plurality of pages based on the image data in a collected manner on one surface of the recording medium; (2) an edition instruction to form images of a plurality of pages based on the image data on front and rear surfaces of the recording medium, respectively; (3) an edition instruction to convert color of an image formed based on the image data on the recording medium; (4) an edition instruction to change magnification of an image formed based on the image data on the recording medium; (5) an edition instruction to erase a designated area of an image formed based on the image data on the recording medium; (6) an edition instruction to change position of an image formed based on the image data on the recording medium; and (7) an edition instruction to execute a prescribed post processing of the recording medium on which an image is formed based on the image data. Any edition instruction other than the edition instructions listed above, by which the manner of display of the image formed on the recording medium is changed, may be included in the first type of edition instructions.

Preferably, the second type of edition instruction is one of or an arbitrary combination of the following edition instructions. (1) An edition instruction to delete image data of an arbitrary page of the image data; (2) an edition instruction to change arrangement of pages based on the image data; (3) an edition instruction to rotate an image of a designated page based on the image data; and (4) an edition instruction to insert image data of a blank page between image data of designated pages, based on the image data. Any edition instruction other than the edition instructions listed above, by which the manner of display of the image formed on the recording medium is not changed, may be included in the second type of edition instructions.

The image forming apparatus in accordance with the present invention may include a preview display unit for displaying a preview of an image formed based on the image data on the recording medium; and a display switching unit for switching a display by the display unit and a display by the preview display unit, in response to a user instruction.

The method of information display in accordance with the present invention may include the steps of displaying a preview of an image formed based on the image data on the recording medium; and switching the step of displaying the page image page by page in order on the display unit and the step of displaying the preview of the image formed on the recording medium, in response to a user instruction.

According to the present invention, whether or not the contents of edition are to be reflected on the page image is automatically determined, depending on the contents of the edition instruction. If the user has given the first type of edition instruction, the contents of edition are reflected on the preview image but not on the page image. Therefore, the page image immediately after reading can be compared with the preview image after edition. If the user has given the second type of edition instruction, the contents of edition are reflected both on the preview image and the page image. Since correspondence between the page image and the preview image is maintained, the page image immediately after reading and the preview image can be compared easily. The user can easily compare the image data immediately after input with the image data after edition page by page, by switching the display of page image and the display of preview image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 shows that an edition instruction to provide monochrome (black-and-white) print of a page image is not reflected on the document display mode screen image.

FIG. 15 shows that an edition instruction to delete a page image is reflected on the document display mode screen image.

FIG. 20 is a flowchart representing a control structure of a program reflecting an edition instruction on the finish preview screen image and the document display mode screen image, in the image forming apparatus in accordance with an embodiment of the present invention.

DESCRIPTION OF THE PREFERRED EMBODIMENTS

Figure 1:
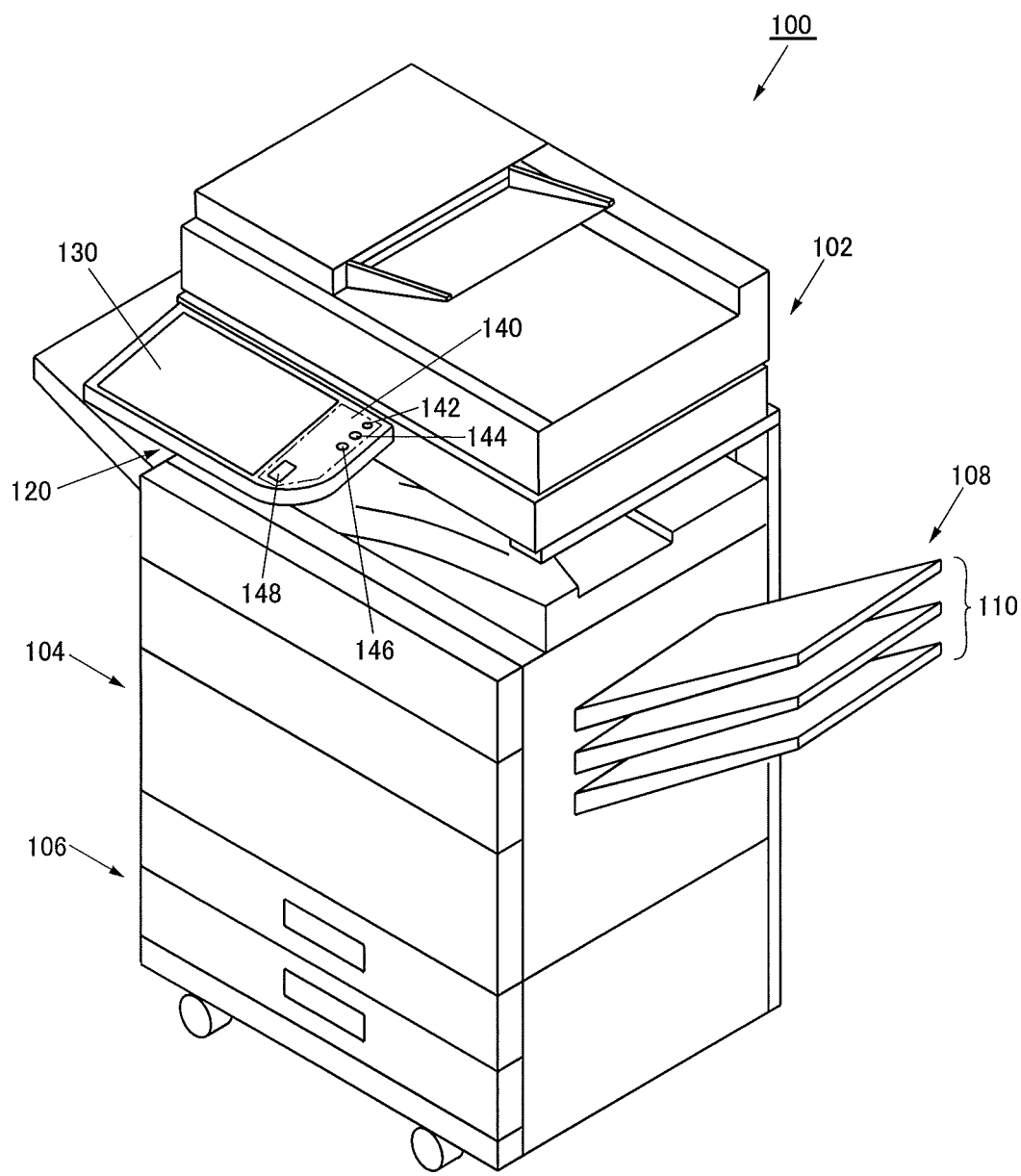
FIG. 1 is a perspective view showing an appearance of the image forming apparatus in accordance with an embodiment of the present invention.

In the following description, the same components are denoted by the same reference characters. Their names and functions are also the same. Therefore, detailed description thereof will not be repeated.

The image forming apparatus in accordance with the present embodiment forms an image on a sheet of recording paper by electro-photography. The image forming apparatus includes, as operational modes, copy mode, FAX mode, document filing mode (a mode in which a scanned image is stored in a storage device in the image forming apparatus) and mail mode (a mode in which a scanned image is transmitted attached to an electronic mail). The image forming apparatus 100 may further include network printer mode. The present invention is not limited to the above, and it may be any image forming apparatus including at least one of the four operational modes, that is, copy mode, FAX mode, document filing mode and mail mode, which displays, in at least one of the operational modes, a function selection menu and preview information on a touch-panel. The printing method is not limited to electro-photography.

[Configuration]

Figure 2:
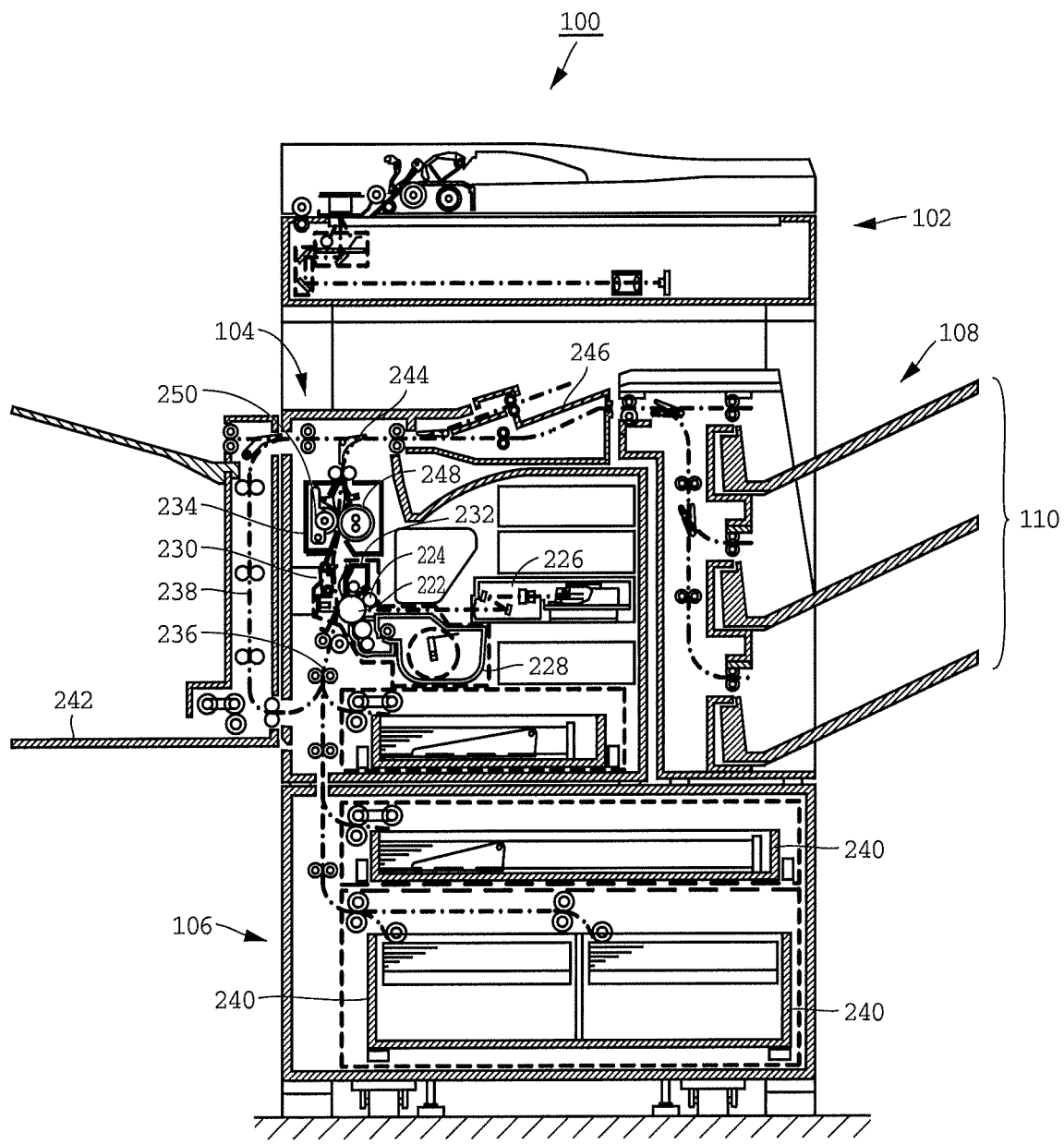
FIG. 2 schematically shows an internal configuration of the image forming apparatus shown in FIG. 1.
Figure 3:
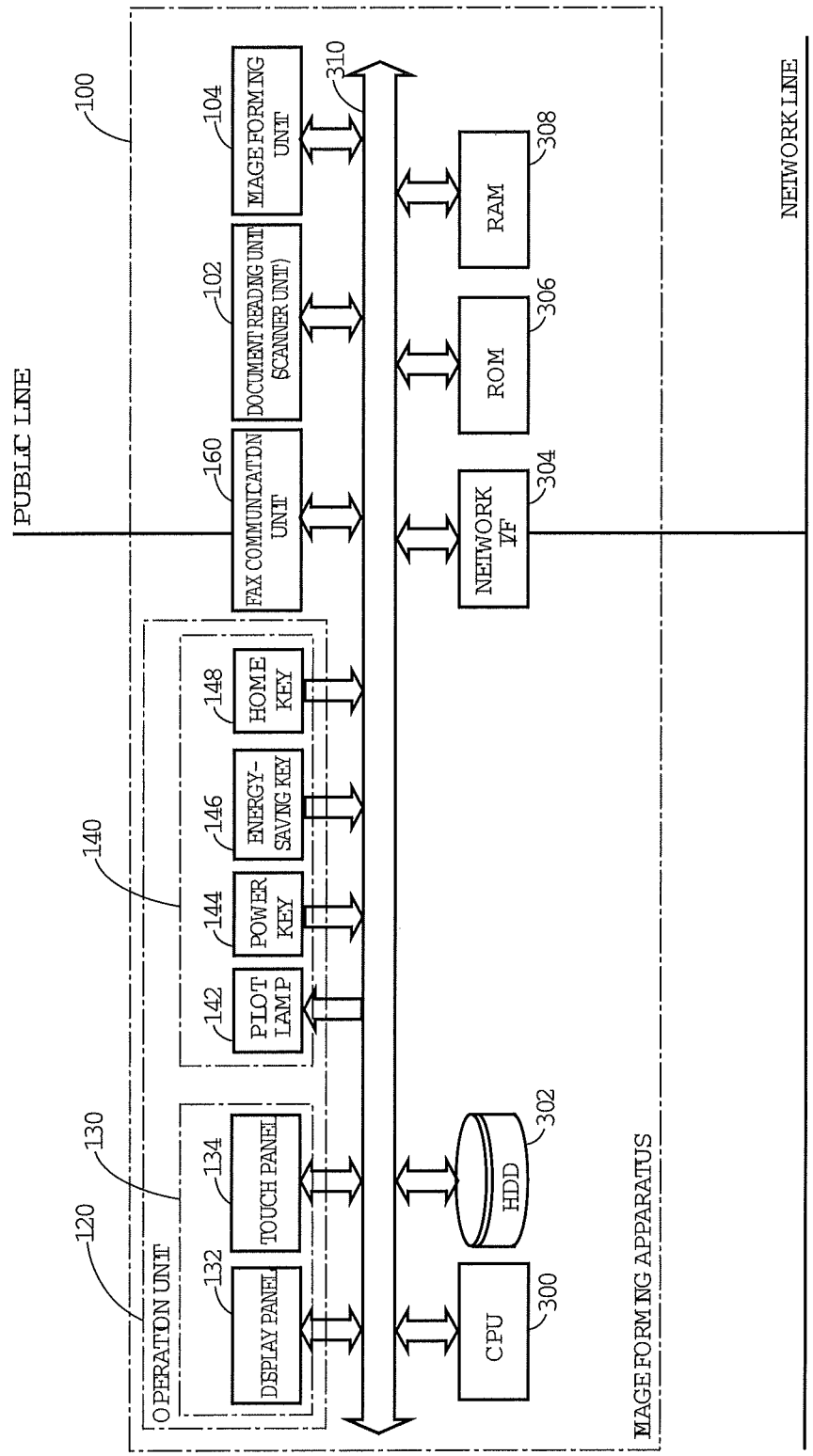
FIG. 3 is a block diagram showing a hardware configuration of the image forming apparatus shown in FIG. 1.

Referring to FIGS. 1 to 3, an image forming apparatus 100 in accordance with the present embodiment will be described.

Referring to FIGS. 1 to 3, image forming apparatus 100 includes a document reading unit 102, an image forming unit 104, a paper feed unit 106, a paper discharge unit 108 and an operation unit 120. Operation unit 120 includes a touch-panel display 130 (hereinafter simply referred to as "display 130") and a display operation unit 140. Display 130 includes a display panel 132 formed of a liquid crystal panel or the like, and a touch-panel 134 arranged on display panel 132. Touch-panel 134 detects trajectory of a user's finger touching the surface. Display operation unit 140 includes a pilot lamp 142, a power key 144, an energy-saving key 146, and a home key 148 for returning the display screen image on display 130 to a home screen image. The home screen image is a screen image allowing the user to select various operational modes.

As described above, image forming apparatus 100 in accordance with the present embodiment is provided with display 130 as a main operation device, and, in addition, with display operation unit 140 including hardware keys and a pilot lamp. The keys (power key 144, energy-saving key 146 and home key 148) of display operation unit 140 are hardware buttons, different from the software buttons realized by display 130.

In the present embodiment, a scanned image can be displayed on a preview screen image. The preview display is given in copy mode, mail mode, FAX mode and document filing mode. In any of these modes, the function of image forming apparatus 100 related to the preview display is basically the same. Therefore, in the following, a schematic configuration of image forming apparatus 100 will be described mainly referring to the copy mode as an example.

In the copy mode, mainly document reading unit 102 and image forming unit 104 operate.

In image forming apparatus 100, a document placed on a platen is read by document reading unit 102 as image data. The image data is subjected to various image processing operations, and the resulting image data is output to image forming unit 104.

Image forming unit 104 is for printing an image of the document represented by the image data on a recording medium (in most cases, on a sheet of recording paper). Image forming unit 104 includes a photoreceptor drum 222, a charger 224, a laser scanning unit (hereinafter denoted as LSU) 226, a developer 228, a transfer device 230, a cleaning device 232, a fixing device 234 and a neutralizer, not shown.

In image forming unit 104, a main feeding path 236 and a reverse feeding path 238 are provided, and a sheet of recording paper fed from paper feed unit 106 is fed along main feeding path 236. Paper feed unit 106 draws out sheets of recording paper stacked on a paper feed cassette 240 or on a manual feed tray 242 one by one, and feeds the sheet of paper to main feeding path 236 of image forming unit 104.

While the sheet of recording paper is fed along main feeding path 236 of image forming unit 104, the sheet passes between photoreceptor drum 222 and transfer device 230, and further passes through fixing device 234, whereby printing is done on the sheet of recording paper.

Photoreceptor drum 222 rotates in one direction, and its surface is cleaned by cleaning device 232 and the neutralizer and, thereafter, uniformly charged by charger 224.

LSU 226 modulates the laser beam based on the image data to be printed, and repeatedly scans the surface of photoreceptor drum 222 with the modulated laser beam in a main scanning direction, whereby an electrostatic latent image is formed on the surface of photoreceptor drum 222.

Developer 228 develops the electrostatic latent image by supplying toner to the surface of photoreceptor drum 222, and thus, a toner image is formed on the surface of photoreceptor drum 222.

Transfer device 230 transfers the toner image on the surface of photoreceptor drum 222 to the sheet of recording paper passing between transfer device 230 and the photoreceptor drum 222.

Fixing device 234 includes a heating roller 248 and a pressure roller 250. Heating roller 248 is for heating the sheet of recording paper. Pressure roller 250 is for pressing the sheet of recording paper. As the sheet of recording paper is heated by heating roller 248 and pressed by pressure roller 250, the toner image that has been transferred to the sheet of recording paper is fixed on the sheet. A heater is heated by electric power supplied to fixing device 234 and controlled such that temperature of heating roller 248 attains to an appropriate temperature for fixing. When operational mode is changed to the energy saving mode, power supply to the heater is, for example, stopped or reduced.

At a position of connection between main feeding path 236 and reverse feeding path 238, a separation pawl 244 is arranged. When printing is done only on one side of the sheet of recording paper, separation pawl 244 is so positioned that the sheet of recording paper fed from fixing device 234 is guided to paper discharge tray 246 or a paper discharge unit 108.

When printing is done on both sides of the sheet of recording paper, separation pawl 244 is turned to a prescribed direction, so that the sheet of recording paper is guided to reverse feeding path 238. The sheet of recording paper passes through reverse feeding path 238, turned upside-down and again fed to main feeding path 236, and while it is again fed along main feeding path 236, printing is done on its rear surface, and thereafter the sheet is guided to paper discharge tray 246 or to paper discharge unit 108.

The sheet of recording paper printed in the above-described manner is guided to paper discharge tray 246 or to paper discharge unit 108, and discharged to paper discharge tray 246 or to any of paper discharge trays 110 of paper discharge unit 108.

Paper discharge unit 108 may perform a process of sorting a plurality of printed sheets of paper to be output to different discharge trays 110, a process of punching each sheet of recording paper or a process of stapling the sheets of recording paper. Assume that a number of copies of the printing are to be prepared. In that case, sheets of recording paper are sorted and discharged to paper discharge trays 110 such that each tray 110 contains each set of printed sheets, and the set of printed sheets in each tray 110 is stapled or punched.

Referring to FIG. 3, image forming apparatus 100 further includes operation unit 120, ROM (Read Only Memory) 306, a hard disk drive (hereinafter denoted as HDD) 302, and an RAM (Random Access Memory) 308. Operation unit 120 allows setting of functions related to the copy mode, facsimile mode, document filing mode and mail mode. ROM 306 stores programs and the like. HDD 302 is a non-volatile storage area capable of storing programs and data even when power is cut off. RAM 308 provides a storage area when a program is executed.

Image forming apparatus 100 further includes a bus 310 and CPU 300. Document reading unit 102, image forming unit 104, FAX communication unit 160, operation unit 120, ROM 306, HDD 302, RAM 308, and CPU 300 are connected to bus 310. CPU 300 realizes general functions as the image forming apparatus.

HDD 302 stores files of image data of documents scanned by image forming apparatus 100, folder by folder, together with date and time of saving and name of the user who saved.

ROM 306 stores programs and data necessary for controlling operations of image forming apparatus 100. CPU 300 controls image forming apparatus 100 in accordance with the programs and data stored in ROM 306, and executes control related to various functions of image forming apparatus 100.

As shown in FIG. 3, a public line is connected for transmitting/receiving image data, to FAX communication unit 160. To network interface (hereinafter referred to as network I/F) 304, a network line is connected. To the network line, a computer or the like using image forming apparatus 100 as a network-supported printer may be connected. To the network line, a computer or the like identified by a URL (Uniform Resource Locator) designated through the Internet may be connected. When connected to the Internet, image forming apparatus 100 can obtain necessary information through the Internet.

RAM 308 provides a function of a working memory for temporarily storing results of operations and processes by CPU 300, and a function of a frame memory for storing image data.

CPU 300 controls document reading unit 102, image forming unit 104, ROM 306, HDD 302, RAM 308 and touch-panel display 130 and display operation unit 140 forming operation unit 120, by executing a prescribed program or programs. Operation unit 120 communicates with CPU 300 through an input/output I/F.

Operation unit 120 is formed of a plate-shaped panel provided in an inclined manner to be easily viewable by the user. On a surface of operation unit 120, display 130 is provided on the left side area, and display operation unit 140 (pilot lamp 142 and power key 144, energy-saving key 146 and home key 148 as hardware buttons) is provided on the right side area. Display 130 and display operation unit 140 form operation unit 120 as one integrated body as a whole.

Pilot lamp 142 of display operation unit 140 is, for example, an LED (Light Emitting Diode). It is turned on/off (/flickered) under the control of CPU 300. When the user presses power key 144 provided separate from a main power switch, image forming apparatus 100 makes a transition from a standby mode (in which, for example, only the FAX receiving operation is possible with the main power on) to a normal mode, in which every operational mode of image forming apparatus 100 is usable. In this state, pilot lamp 142 is turned and kept on. If a predetermined time passes without any user operation, or if the user presses energy-saving key 146, image forming apparatus 100 makes a transition from the normal mode to the energy saving mode. In the energy saving mode, only some of the operational modes of image forming apparatus 100 can be used. In this state, pilot lamp 142 flickers. Further, if the user presses energy-saving key 146 in the energy saving mode, the image forming apparatus 100 makes a transition from the energy saving mode to the normal mode. Home key 148 is a hardware key for returning the display of touch-panel display 130 to the initial state (home screen image).

In a hardware button (power key 144, energy-saving key 146 and home key 148) of display operation unit 140, a key lamp or key lamps, which is/are turned on/off (/flickered) under the control of CPU 300, may be embedded. By way of example, the key lamps provide a light ring on the edge of a circular key, or the key lamp lights a central portion of the key. The key lamp is turned on at a timing when hardware buttons are allowed to be used as the operation device (at a timing when a process is executed if the hardware button is used).

Image forming apparatus 100 in accordance with the present embodiment includes the four operational modes (copy mode, facsimile mode, document filing mode and mail mode) as described above. On touch-panel display 130, software buttons for setting functions in respective operational modes are displayed, and buttons for setting a destination or a preview as an expected image, for example, are displayed as needed.

In image forming apparatus 100, when an operational mode is selected on the home screen image of display 130, an initial screen image of each operational mode is displayed. The preview screen image of the copy mode has the following characteristics (1) to (4). (1) The screen image is divided into five areas ("system area," "function selecting area," "preview area," "action panel area," and "task trigger area"). Since these areas are arranged appropriately, the flow lines of the user's viewpoint and finger tip similar to those in a conventional device can be realized. As a result, easy operation by the user is ensured. (2) Functions respectively allocated to the five areas are the same even in different preview display modes. Even when the display mode is different, the user may not be confused. (3) The size of "function selecting area" is changed in accordance with the display mode. The size of preview area is also changed accordingly. Thus, the function setting information and preview information can accurately be transmitted to the user. (4) With the "preview area" being the center, the "action panel area" and "task trigger area" are arranged on the opposite side of the "function selecting area." As a result, it becomes possible to select a function on an area ("function selecting area") arranged on one side, to confirm the process by the selected function by the preview on the area arranged at the center, and to request execution of the process on an area ("action panel area" and "task trigger area") arranged on the other side. Specifically, the movements of eyes and hands along with the processing become linear, realizing smooth operations.

[Layout of Copy Basic Screen Image]

Figure 4:
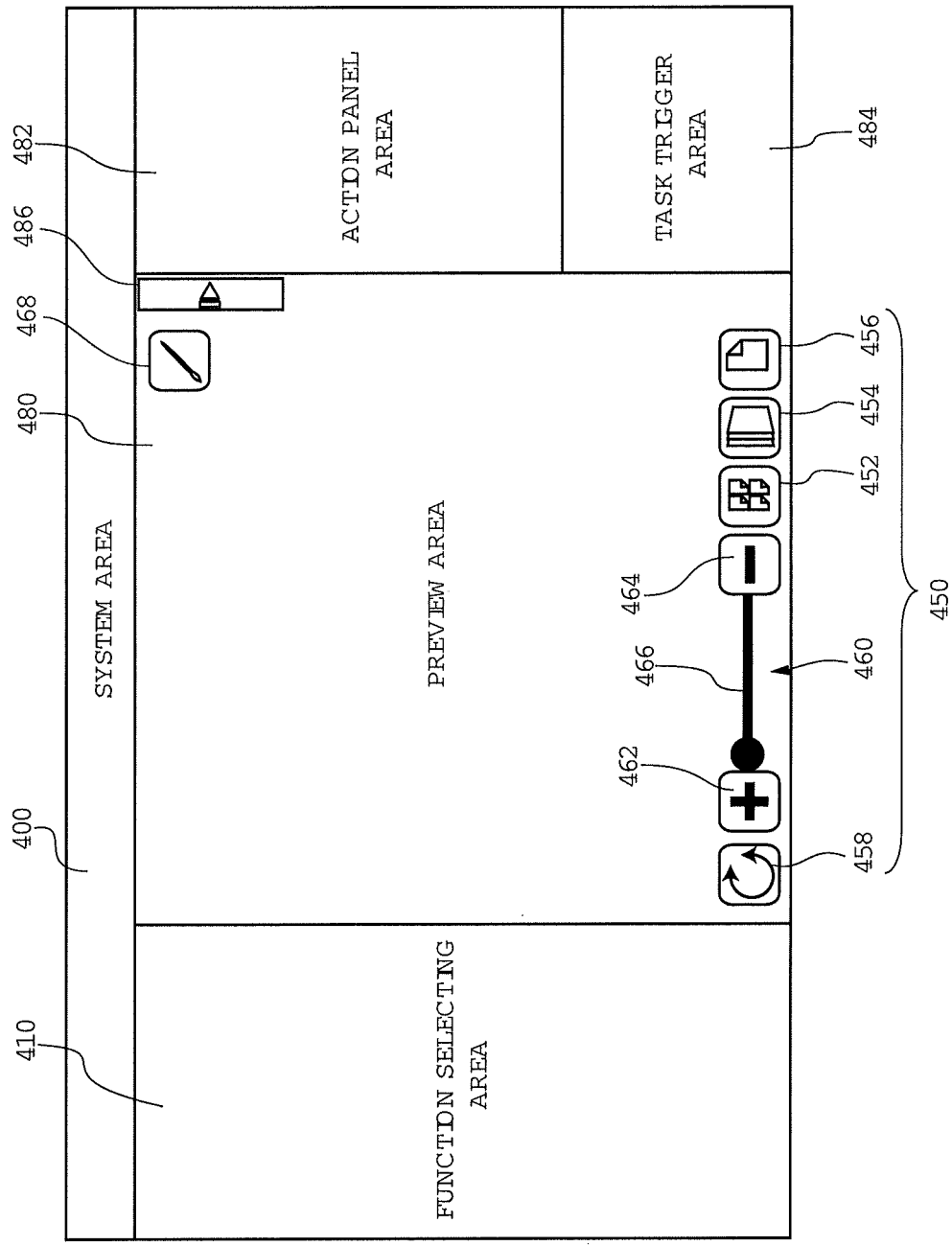
FIG. 4 show a manner of division of a display area of a touch panel in a preview display of the image forming apparatus shown in FIG. 1.

FIG. 4 shows a basic layout in the copy mode operation (referred to as a "copy basic screen image") on display 130. The copy basic screen image is first displayed when the copy mode is selected. One characteristic of the present embodiment is that, basically, preview display is possible in all screen images including the copy basic screen image. Similar image preview display can be selected at the time of facsimile transmission, image transmission by mail or image filing. In any of these operational modes, basic screen image configuration related to preview display is the same. Therefore, in the following, only the copy basic screen image will be described.

Referring to FIG. 4, let us consider display 130 of landscape layout (for example, width of 1024 pixels×length of 600 pixels). System area 400 is arranged at the uppermost portion, and preview area 480 is arranged at the center, of the screen image. On the left side of preview area 480, function selecting area 410 for setting a function and confirming the contents of function is arranged. On the upper right side of preview area 480, action panel area 482 is arranged. On a lower right side of preview area 480, task trigger area 484 is arranged. These areas have their sizes changed in accordance with the preview display modes, as will be described later.

On system area 400, pieces of information related to the current status and state of image forming apparatus 100 are displayed. By way of example, on system area 400, an operational mode name, an interruption key, a log-in user name, status of a currently processed job, state of use of an internal memory, time and the like are displayed.

On function selecting area 410, a function selection menu (icons, buttons, setting items screen image, and a function list screen image) to be operated by the user for setting each function, switching display and confirming setting, is displayed. These are for setting conditions of data conversion and conditions at the time of executing a task, on the image data of the document.

In preview area 480, an image of expected document output (finished form) is displayed. Every time the user designates the manner of finish, the image displayed on preview area 480 changes.

Preview area 480 includes a group of preview change buttons 450 at a lower portion, for changing display style of preview area 480. The group of preview change buttons 450 includes: a rotation button 458; a zoom bar 460; a document display button 452; a finish preview button 454; and a fit-to-screen button 456. Rotation button 458 is a button for rotating the preview by a desired angle. Zoom bar 460 is a bar for enlarging/reducing the preview image. Document display button 452 is a button for instructing change to a document display mode, as will be described later. Finish preview button 454 is a button for instructing a change to a finish preview screen image. Fit-to-screen button 456 is a button for instructing a change to the fit-to-screen mode. At an upper right portion of preview area 480, an image edition button 468 is arranged, for instructing a change to an image edition mode allowing edition of documents. The image edition mode will be described later.

When rotation button 458 is touch-operated, a dialogue for designating rotation angel of the preview image is displayed. When a desired angle is designated, the preview image displayed in the preview area is rotated by that angle.

Zoom bar 460 includes a plus button 462, a minus button 464 and a bar 466. Plus button 462 is for instructing display of preview image in enlarged size of a prescribed magnification ratio. Minus button 464 is for instructing display of preview image in reduced size of a prescribed reduction ratio. Bar 466 is for enlarging or reducing the display of preview image with an arbitrary magnification ratio. When plus button 462 is touch-operated or bar 466 is gesture-operated (slid) toward plus button 462, the preview image is enlarged. When minus button 464 is touch-operated or bar 466 is slid toward minus button 464, the preview image is displayed in reduced size.

If the number of pages of document images to be displayed on preview area 480 is large, a page selection button (page number input button, page feed button, page return button, single page display button, plural page display button and the like) is displayed. When the document image displayed on preview area 480 is flicked, the document page can be fed forward or backward. If the document image displayed on preview area 480 is large, a scroll bar is displayed.

On action panel area 482, pieces of information related to assistance, guidance and suggestion related to the operation are displayed. If, for instance, a user selects a specific function, on action panel area 482, functions related to the selected function may be displayed. Other functions related to the same object of the selected function may be displayed. Further, functions selected in the past by the user or a user of a group to which the user belongs in relation to the selected function may be displayed as "recommended functions."

On the left side of action panel area 482, an action panel reducing button 486 is displayed, which is operated by the user when action panel area 482 is to be displayed in reduced size. When action panel reducing button 486 is pressed, action panel area 482 is reduced in size and displayed in the form of buttons on the right side of the screen image. When the button is pressed, action panel area 482 is again displayed in the enlarged size. Specifically, the user can reduce or enlarge the action panel area 482 by pressing the button. Accordingly, the preview area 480 is enlarged or reduced. Confirmation of preview image and confirmation of operation hints can be done easily in accordance with the user's intention.

In task trigger area 484, items (software buttons) as triggers for starting certain processes of image forming apparatus 100 are displayed. These items are displayed when all settings are completed in a certain operational mode and image forming apparatus 100 is ready to operate actually. By way of example, in task trigger area 484, a scan start button (in FIG. 5 and the following, "SCAN IN" button), a monochrome copy start button (MONO START), a color copy start button (COLOR START) and a clear all button (CA) are displayed. The scan start button is used for starting a process of once reading a document and providing a preview in copying, FAX transmission or the like. The monochrome copy start button is used for starting a process of reading a document and immediately forming a black-and-white image thereof on a sheet of recording paper. Color copy start button is used for starting a similar process of immediately forming a color image of the document. The clear all button is used for clearing all pieces of input information.

In the present embodiment, positions where these five areas are arranged are not changed even when the preview display mode is changed. It is noted, however, that function selecting area 410, preview area 480, action panel area 482 and task trigger area 484 have their size changed in the widthwise direction of the screen image (longitudinal direction) of display 130 in accordance with the display mode. The reason for this is to provide easily viewable preview image and thereby to allow reliable and easy operation.

These five areas are arranged in consideration of the flow line of user's viewpoint and the flow line of user's operation, in addition to the user interface of conventional devices. With such an arrangement, the user's viewpoint moves from upper left to lower right, and the user operation (finger tip of the dominant hand) moves from upper left to lower right. This advantageously enables a user-friendly operation.

[Display Layout in Each Display Mode]

In the following, the screen image configuration in display modes using the preview will be described. The positions where preview area 480, function selecting area 410, action panel area 482 and task trigger area 484 are arranged are basically the same in any of the screen images. The width of these areas (length along the longitudinal direction of display 130) changes in accordance with the screen image. As the width changes, elements displayed therein also change. The manner of transition of these display modes will be described later.

(1) Fit-to-Screen

Figure 5:
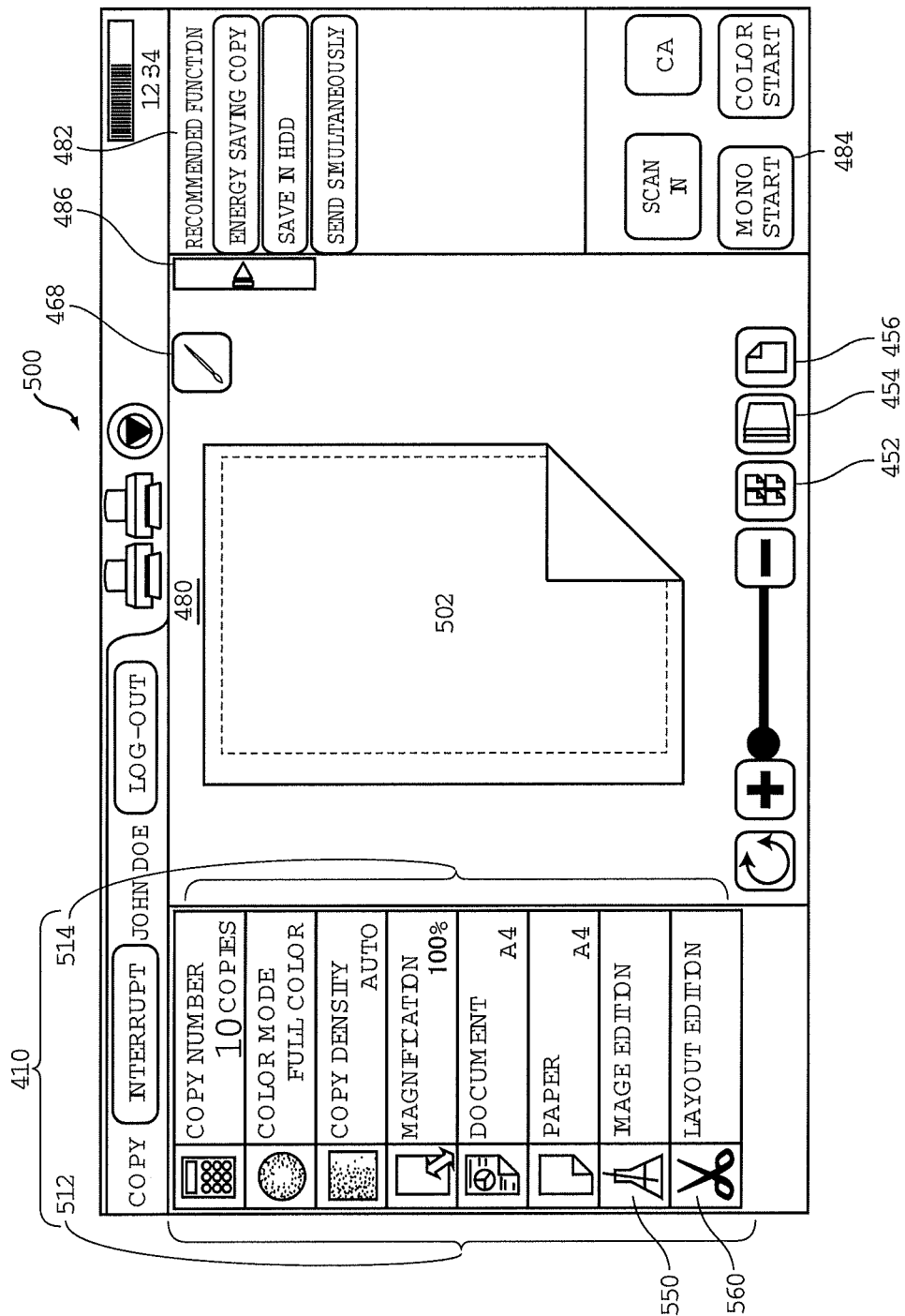
FIG. 5 shows a manner of division of a display area in a fit-to-screen display mode in the preview display of the image forming apparatus.

Referring to FIG. 5, a fit-to-screen screen image 500 is used for displaying a read image when, for example, a scanning operation is completed. At the center, preview area 480 is arranged. Here, a preview image 502 of one page of document is displayed as large as possible in preview area 480. On the left side of preview area 480, function selecting area 410 is arranged. On function selecting area 410, a group of function icons 512 and a group of texts 514 describing the functions of respective function icons are displayed. Of the group of icons 512, icon 550 represents an image edition icon for editing images, and icon 560 represents a layout edition icon for layout edition. On an upper right side of preview area 480, action panel area 482 is arranged. Task trigger area 484 is arranged therebelow.

If the right end of function selecting area 410 is flicked to the left, function selecting area 410 is displayed in a reduced size on the left side of the screen image, and only the group of function icons 512 is displayed. The group of texts 514 is erased. Even in this state, since group of function icons 512 for selecting functions is displayed, the user is kept aware of each of these functions. As a result, it is less likely that the user is confused in selecting a function.

If the right end of function selecting area 410 is flicked to the right, function selecting area 410 is drawn to the right. Here, the background of function selecting area 410 becomes semi-transparent, and the user can see the image of preview area 480. The entire preview image can be confirmed when a function is to be selected. Thus, it is possible for the user to easily select an appropriate function.

Figure 7:
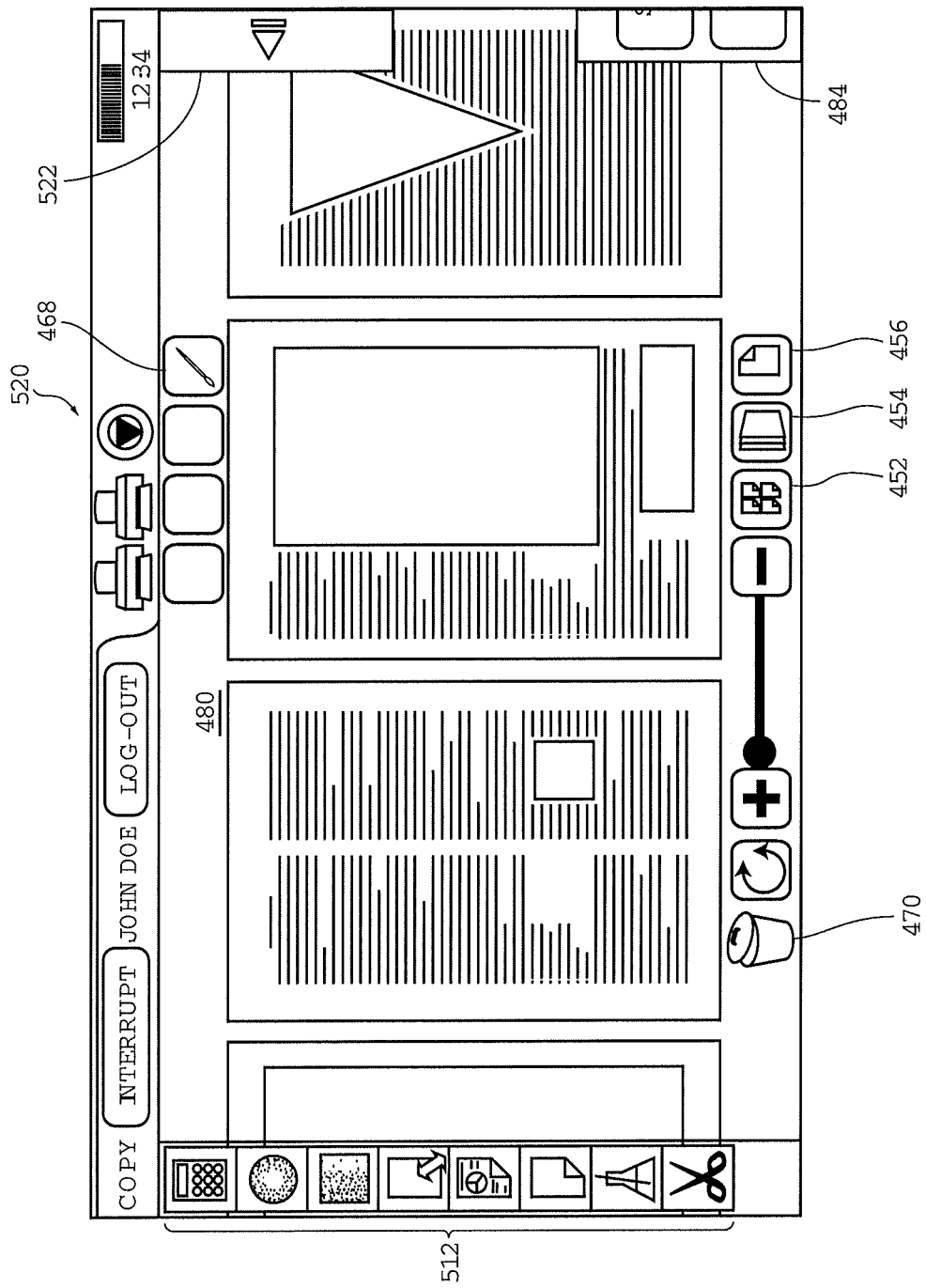
FIG. 7 shows a manner of division of a display area in an image edition mode in the preview display of the image forming apparatus.

When an action panel reducing button 486 is pressed, action panel area 482 is reduced to the right side, and expansion button 522 shown in FIG. 7 is displayed. When expansion button 522 is pressed, action panel area 482 is expanded and displayed to the left side. This is the same in other screen images.

(2) Finish Preview

Figure 6:
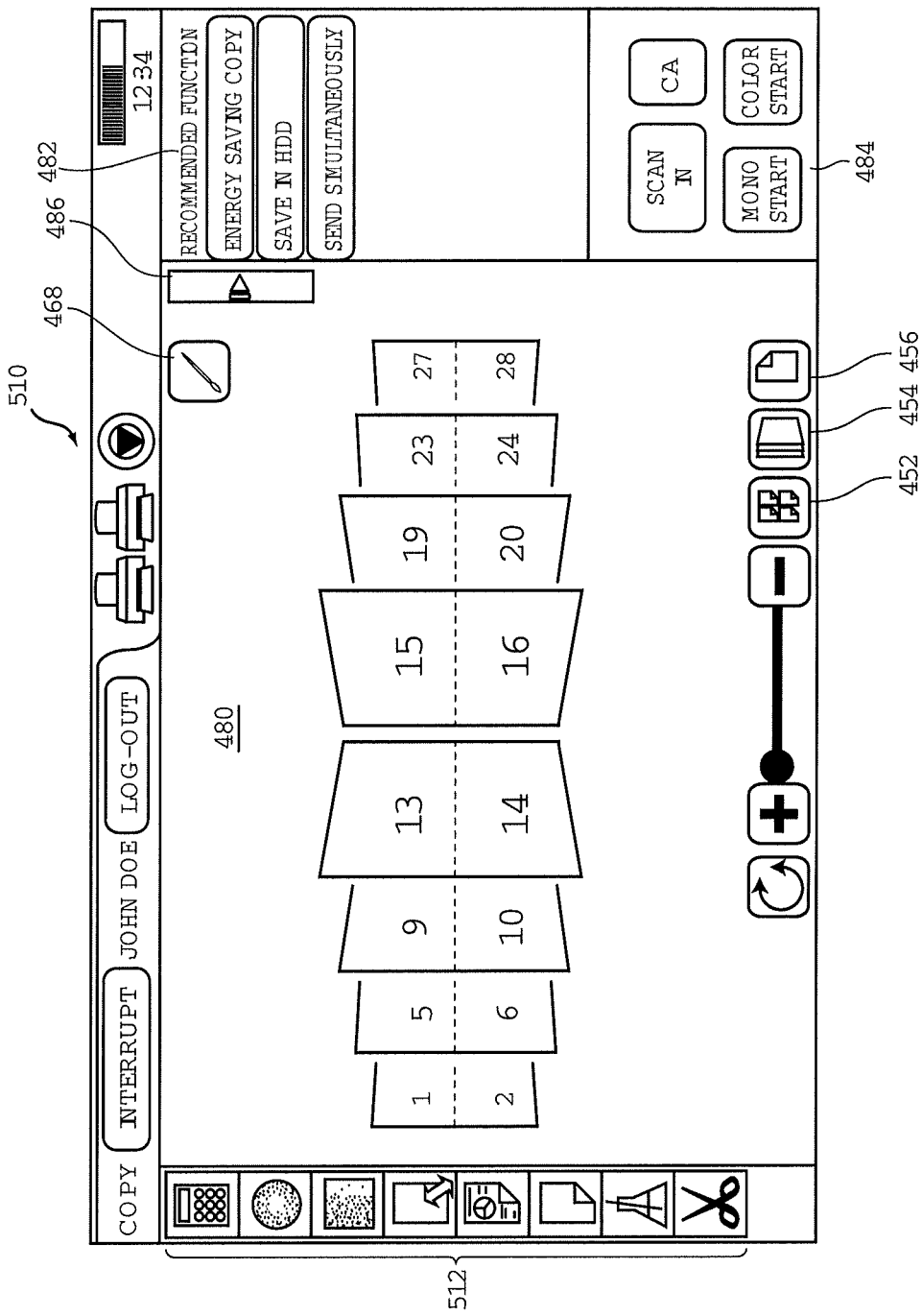
FIG. 6 shows a manner of division of a display area in a finish preview display mode in the preview display of the image forming apparatus.

Referring to FIG. 6, in finish preview screen image 510, function selecting area 410 is displayed in reduced size on the left side. In function selecting area 410, only the group of function icons 512 is displayed. The group of texts 514 is not displayed. Action panel area 482 and task trigger area 484 are similar to those in fit-to-screen screen image 500. Since the width of function selecting area 410 is reduced, the lateral width of preview area 480 becomes larger by that amount. As a result, the overall configuration can be grasped more easily when many images are arranged in preview area 480 as in the case of finish preview. The image arranged at the center is displayed large enough to allow sufficient confirmation of its contents.

In finish preview, only the group of function icons 512 is displayed and the group of texts 514 is not displayed. However, if the right end of the group of function icons 512 is flicked to the right, function selecting area 410 is expanded from the group of function icons 512 and displayed to the right side. After expansion, the group of texts 514 is displayed on the right side of the group of function icons 512, and the display becomes similar to fit-to-screen screen image 500. It is noted, however, that function selecting area 410 is made semi-transparent. Therefore, preview area 480 on the lower layer can be seen through function selecting area 410. If a prescribed time period passes without any operation of a function icon or text after the expansion of function selecting area 410, function selecting area 410 is again reduced, and the display of only the group of function icons 512 is resumed. When execution of a function selected by the user is completed, again, function selecting area 410 is reduced and the display of only the group of function icons 512 is resumed.

(3) Image Edition Mode

Image edition mode not only provides simple display of images but also allows processes such as insertion of a blank page and erasure of a part of an image. Referring to FIG. 7, in image edition mode screen image 520, as in finish preview screen image 510, function selecting area 410 is displayed in reduced size on the left side. On function selecting area 410, only the group of function icons 512 is displayed. Different from finish preview screen image 510, in image edition mode screen image 520, action panel area 482 that has been displayed in finish preview screen image 510 is folded to the right side, and only an expansion button 522 is displayed instead. When expansion button 522 is pressed, action panel area 482 is expanded and displayed. Here again, action panel area 482 is displayed semi-transparent, so that the display on underlying preview area 480 can be confirmed. If a prescribed time period passes without any operation of action panel area 482, action panel area 482 is again folded and replaced by expansion button 522. Similarly, when the left end of task trigger area 484 that has been displayed in reduced size is flicked to the left, task trigger area 484 is enlarged to the normal size. Here, the background of task trigger area 484 is also made semi-transparent. While task trigger area 484 is displayed, it is possible to operate any button in task trigger area 484. If a prescribed time period passes without any operation of task trigger area 484, task trigger area 484 is again displayed in reduced size.

In the image edition mode, task trigger area 484 is also reduced, to the right side. Here, only a part of buttons on task trigger area 484 is viewable. In the image edition mode, however, what is given priority is edition of page images. Therefore, task trigger area 484 reduced and displayed in such a manner does not cause any problem.

In the image edition mode, function selecting area 410, action panel area 482 and task trigger area 484 are reduced in width. Most part of the display area of display 130 can be used as preview area 480. Therefore, image edition and confirmation of edited image can be done easily.

In the image edition mode, though reduced in size, expansion button 522 is displayed on the upper right side of the screen image in place of action panel area 482 and task trigger area 484 is displayed on the lower right side of the screen image, respectively. Even during image edition, the user is aware of the positions where these areas exist, and hence, he/she can edit images at ease.

(4) Document Display Mode

Figure 8:
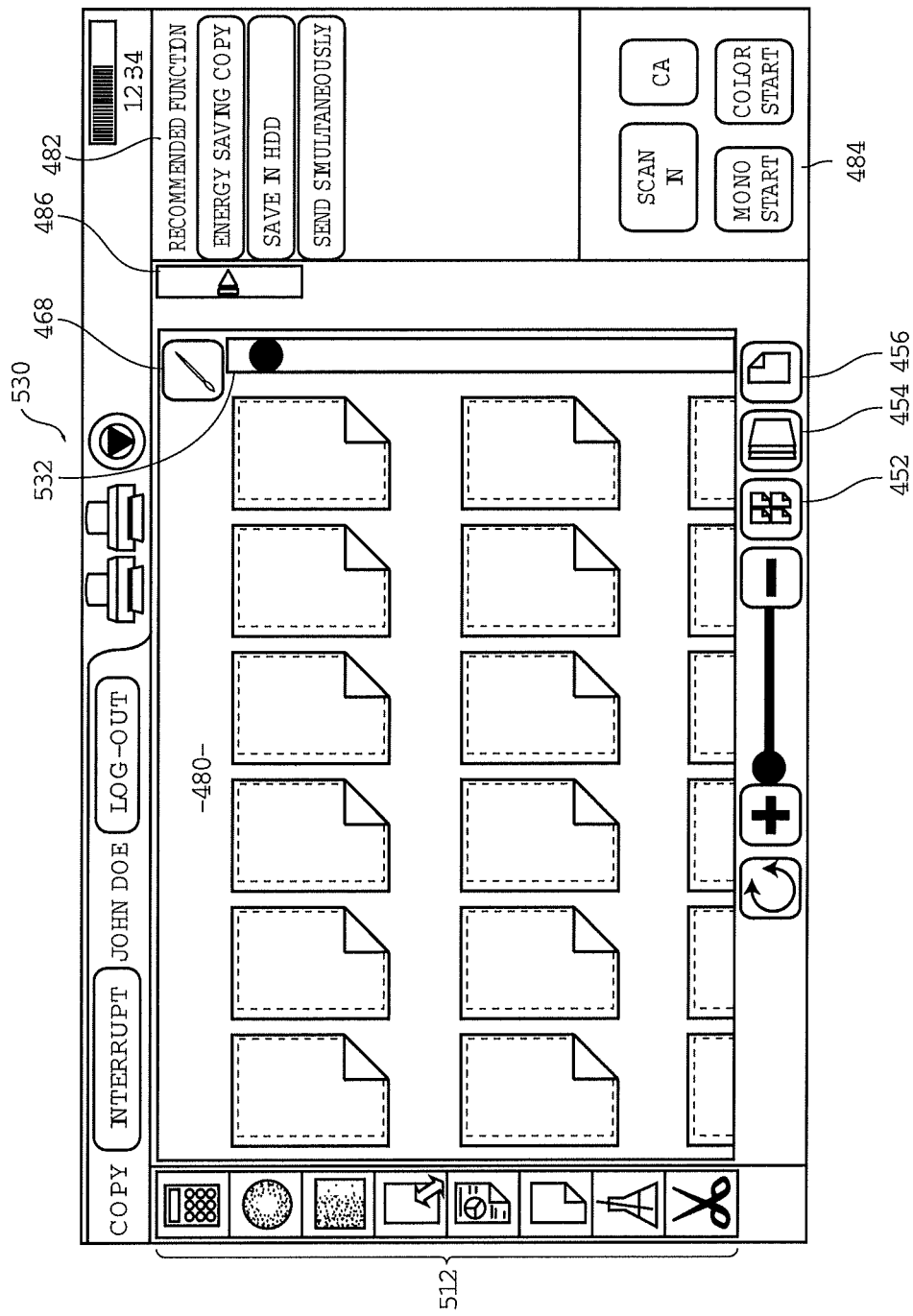
FIG. 8 shows a manner of division of a display area in a document display mode in the preview display of the image forming apparatus.

Referring to FIG. 8, in document display mode screen image 530, a plurality of read page images are arranged in a matrix, in preview area 480. Function selecting area 410 is reduced and only the group of function icons 512 is displayed. Action panel area 482 and task trigger area 484 are in normal manner of display, as in fit-to-screen screen image 500. The size of preview area 480 becomes larger than in fit-to-screen screen image 500 and, therefore, larger number of pages can be displayed. In the present embodiment, the plurality of images are arranged in accordance with the lateral width of preview area 480. If the number of images is large and not all can be displayed, a scroll bar 532 is displayed at a right end of preview area 480. By operating scroll bar 532, the images displayed on preview area 480 can be moved upward/downward. The images can also be moved upward/downward by flicking the screen image.

[Screen Image Transition]

Figure 9:
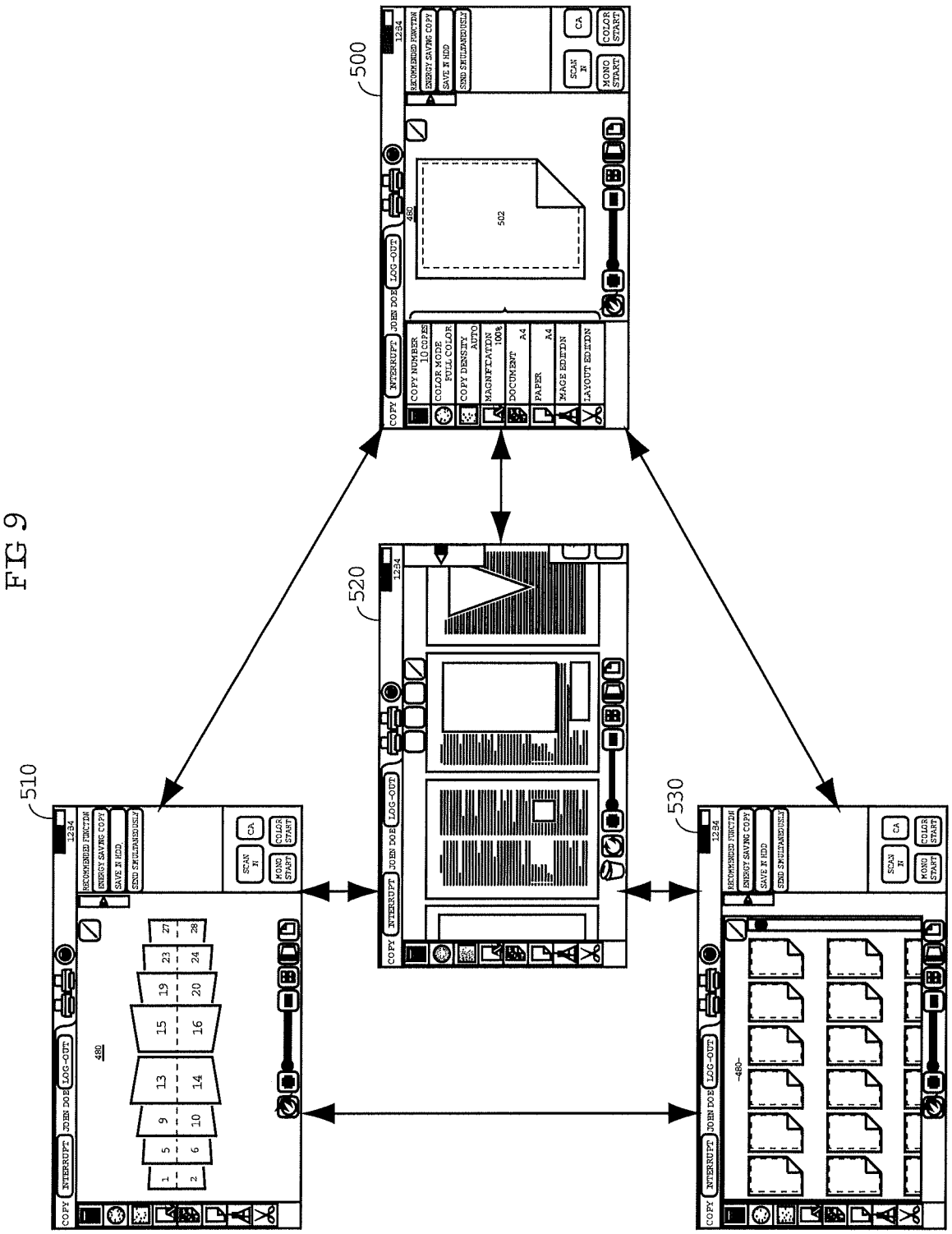
FIG. 9 shows preview display image transition in the image forming apparatus in accordance with an embodiment of the present invention.

Referring to FIG. 9, it is possible to make a transition from any of fit-to-screen screen image 500, finish preview screen image 510, image edition mode screen image 520 and document display mode screen image 530 to any arbitrary screen image.

(1) On any screen image, when fit-to-screen button 456 is touched, a transition to fit-to-screen screen image 500 shown in FIG. 5 occurs. Here, on preview area 480, a preview image of a document page that has been focused (that has been selected) is displayed.

(2) On any screen image, when finish preview button 454 is pressed, a transition to finish preview screen image 510 shown in FIG. 6 occurs. In the finish preview screen image 510, a document image as processed in accordance with the user setting is generated and displayed on preview area 480. In FIG. 6, a finish preview image when 2-in-1 collection and duplex printing are designated is displayed as an example.

(3) On any screen image, when image edition button 468 is pressed, a transition to image edition mode screen image 520 shown in FIG. 7 occurs. In image edition mode screen image 520, buttons for image edition are displayed next to image edition button 468. Further, on a lower left portion of preview area 480, a trash bin icon 470 is displayed. When an image of any page of the document images is drag-and-dropped to trash bin icon 470, the image of the page is deleted from the document.

(4) On any screen image, when document display button 452 is pressed, transition of the screen image to document display mode screen image 530 shown in FIG. 8 occurs. The scanned document is displayed in a matrix. When it is impossible to display all pages of the document, scroll bar 532 is displayed.

[Image Edition]

It is possible for the user to edit document, using various editing functions displayed on function selecting area 410, on an arbitrary selected page image. Document edition includes two types of editions, that is, edition of each page and edition of a plurality of pages. In the present embodiment, the former will be referred to as image edition and the latter is referred to as layout edition. The image edition includes image frame erasure, addition of texts, embedding of watermark, and addition of a user stamp. The layout edition includes page collection of collecting a plurality of pages to one page, setting of margin for a plurality of pages, and movement of pages. The image edition and layout edition are made possible by pressing image edition icon 550 or layout edition icon 560. When a document image is drag-and-dropped to trash bin icon 470, or when a document page is selected and trash bin icon 470 is touched, the page can be deleted.

Referring to FIGS. 10 to 16, the process how image data 610 read by image forming apparatus 100 changes in accordance with edition instructions by the user will be described.

Figure 10:
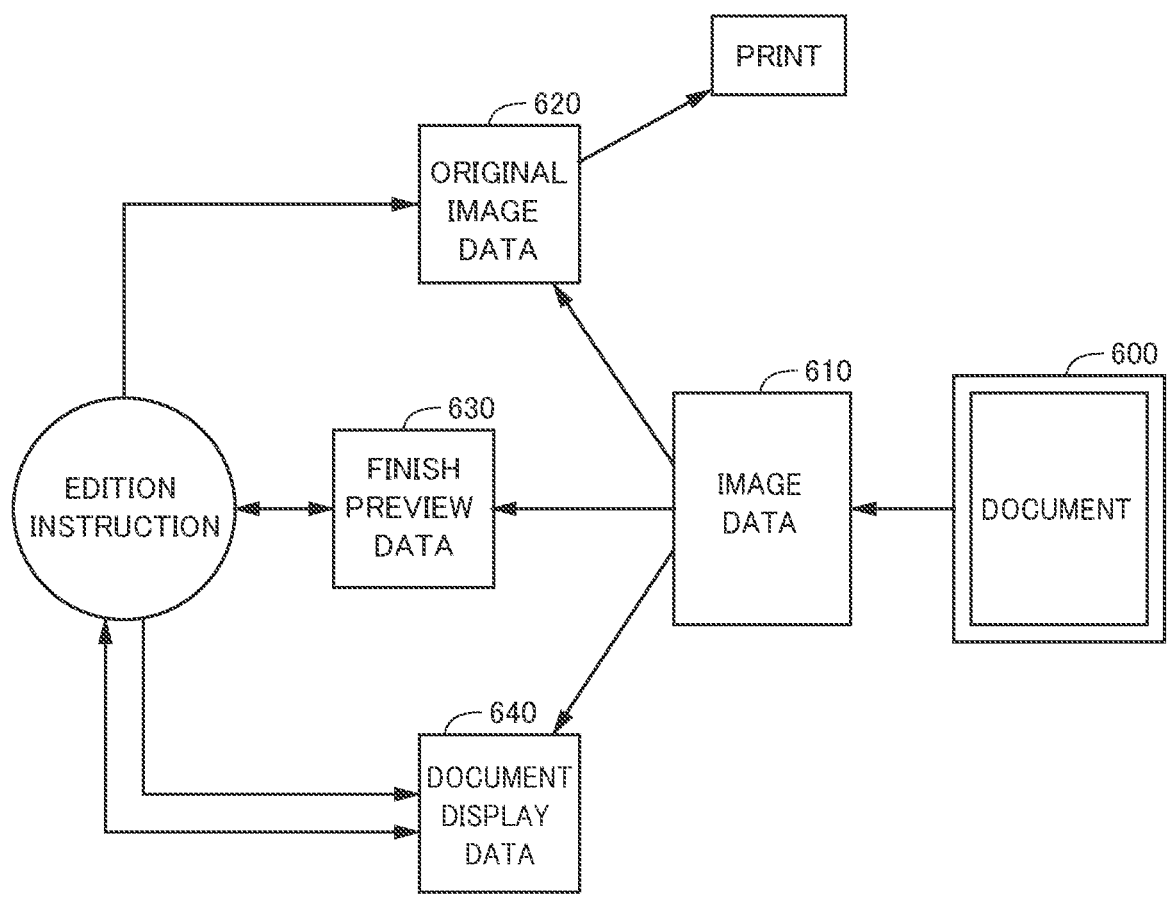
FIG. 10 shows a process from image data reading to printing, in the image forming apparatus in accordance with an embodiment of the present invention.

Referring to FIG. 10, by a scanning unit or the like of image forming apparatus 100, image data 610 is read from a document 600. Based on image data 610, original image data 620, finish preview data 630 and document display data 640 are formed. These data have different resolutions, in accordance with the object of use. Original image data 620 has the highest resolution, and finish preview data 630 has the second highest. Document display data 640 has the lowest resolution, since it does not display detailed contents of each page. Therefore, in the editing phase, edition of document image of each page (image edition) is done using the finish preview data 630 having the resolution lower than original image data 620 but higher than document display data 640. On the other hand, edition of a plurality of pages (layout edition) is, in principle, done on document display data 640.

First Type of Edition Instruction

Of the edition instructions given by the user, an edition instruction which causes change in the manner of display of the image formed on a recording medium before and after the edition will be referred to as a first type of edition instruction in the present specification. The first type of edition instruction changes the contents of document formed on the recording medium, while it does not have any influence on the arrangement and direction of display of the pages.

When an image is edited by the first type of edition instruction, the contents of instruction are reflected on finish preview data 630, but not on document display data 640. Therefore, after the edition, a page image reflecting the contents of edition is displayed on finish preview screen image 510, and a page image not changed from before the edition is displayed in document display mode screen image 530, respectively.

Edition instructions related to a masking operation, duplex printing and monochrome printing classified as the first type of edition instructions will be specifically described with reference to FIGS. 11 to 13.

—Masking Operation—

Figure 11:
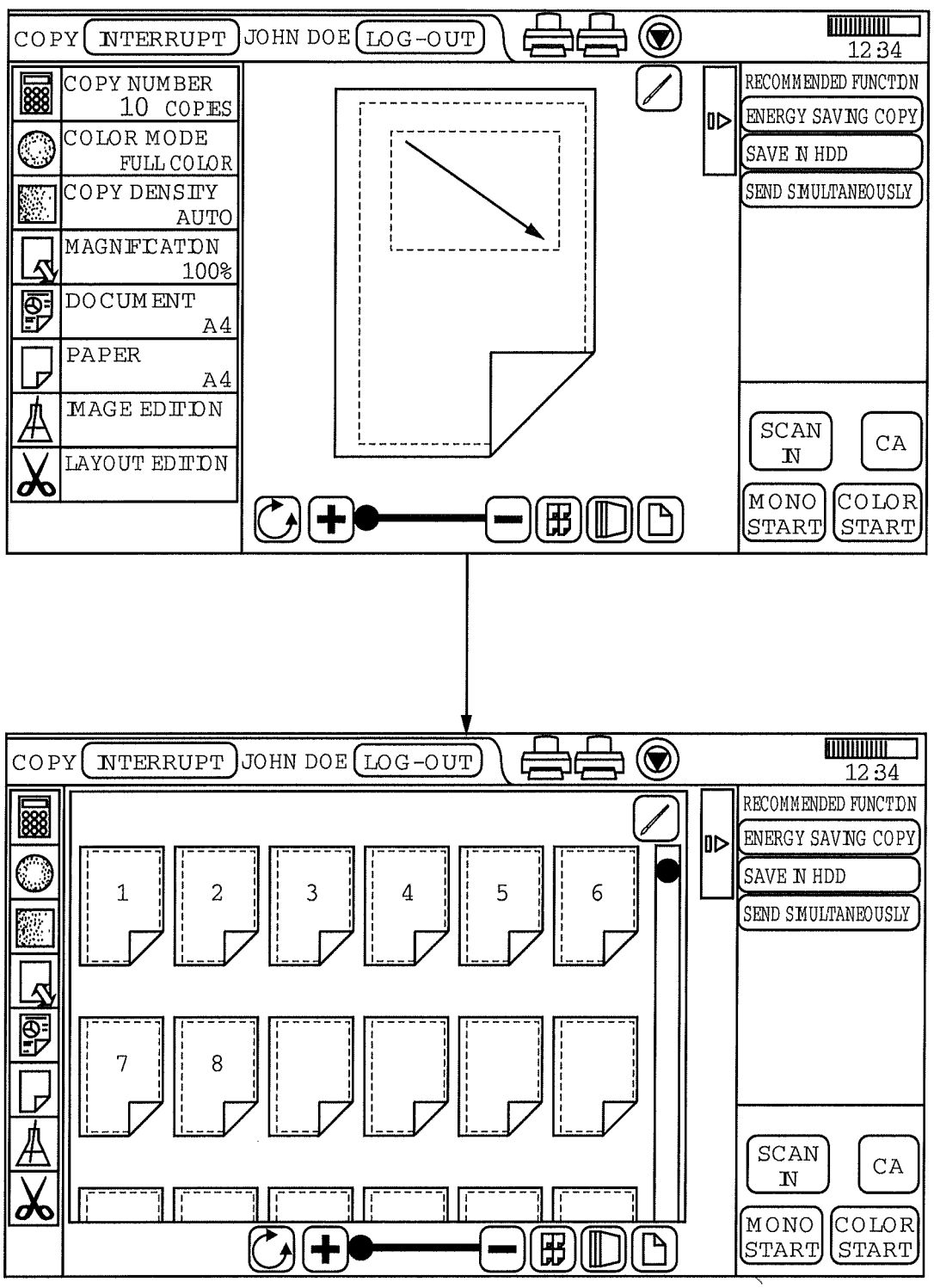
FIG. 11 shows that an edition instruction to hide a part of displayed contents of a page image is not reflected on the document display mode screen image.

Referring to FIG. 11, it is possible for the user to hide a partial area of a page which is not to be an object of working. In the present specification, this operation will be referred to as masking operation. The user touches image edition icon 550 with his/her finger, to select the masking operation. Further, on the page of interest of which preview display is given on the screen image, the user drags and designates a scope to be masked. When this operation ends and then finish preview button 454 is pressed, the edition process is done on finish preview data 630 and the image after edition is displayed on finish preview screen image 510. The edition, however, is not done on document display data 640 and, therefore, even if document display button 452 is pressed, the page image is displayed on document display mode screen image 530 in the same manner as before the edition.

—Duplex Printing—

Figure 12:
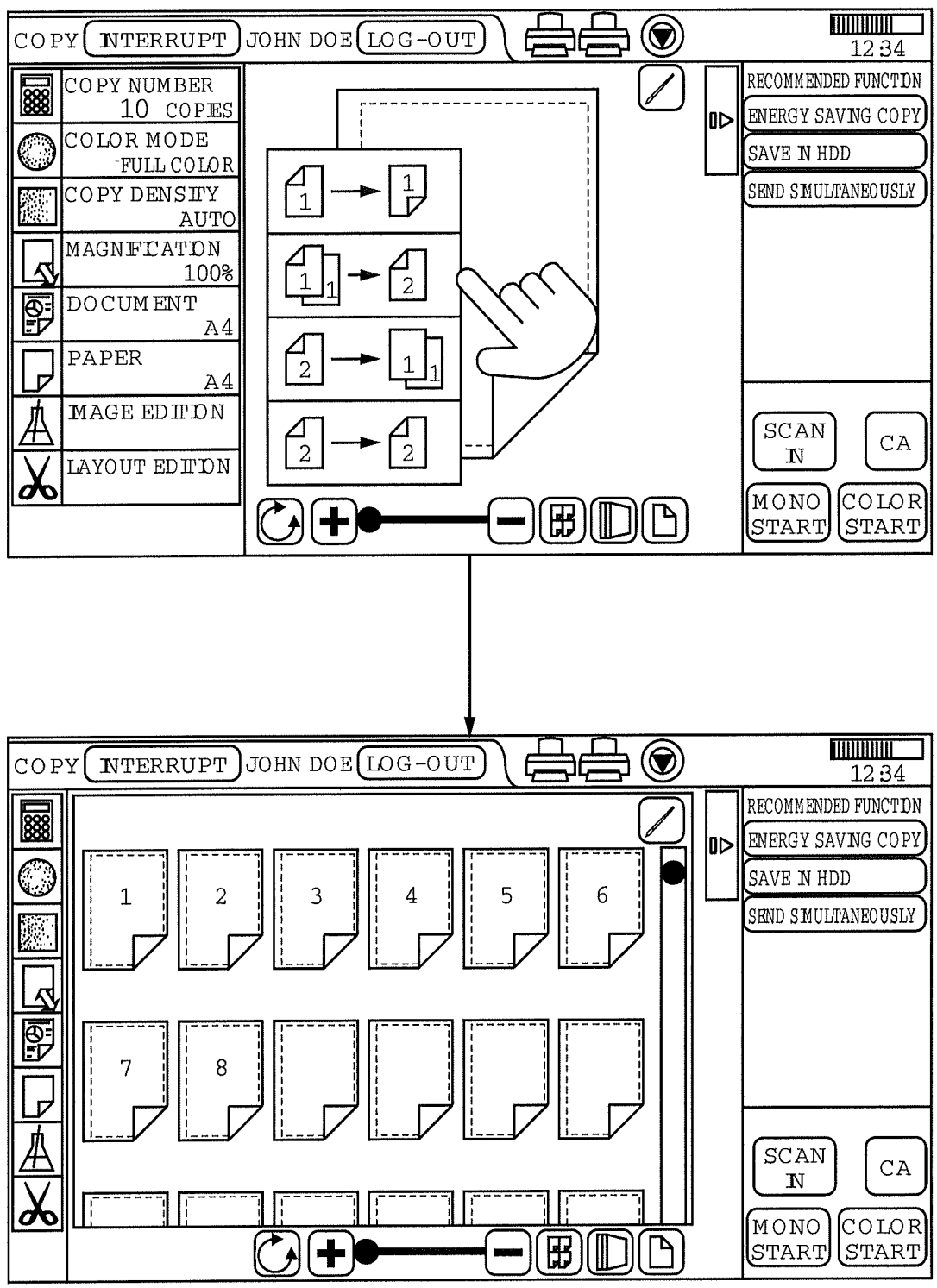
FIG. 12 shows that an edition instruction to provide duplex (two-sided) print of a page image is not reflected on the document display mode screen image.

Referring to FIG. 12, the user touches layout edition icon 560 with his/her finger, to select the duplex printing. This edition is done on finish preview data 630, and when this operation ends and then finish preview button 454 is pressed, the image after edition is displayed on finish preview screen image 510. The edition, however, is not done on document display data 640 and, therefore, even if document display button 452 is pressed, the page image is displayed on document display mode screen image 530 in the same manner as before the edition.

—Monochrome Printing—

Referring to FIG. 13, the user touches layout edition icon 560 with his/her finger, to select the monochrome printing. When this operation ends and then finish preview button 454 is pressed, the image after edition (monochrome image) is displayed on finish preview screen image 510. The edition, however, is not done on document display data 640 and, therefore, even if document display button 452 is pressed, the page image is displayed on document display mode screen image 530 in the same manner as before the edition.

Second Type of Edition Instruction

Of the edition instructions given by the user, an edition instruction which does not cause any change in the manner of display of the image formed on a recording medium before and after the edition will be referred to as a second type of edition instruction in the present specification. The second type of edition instruction influences the arrangement and direction of display of the pages.

When an image or images are edited by the second type of edition instruction, the contents of instruction are reflected on finish preview data 630 and document display data 640. Therefore, after the edition, page images reflecting the contents of edition are displayed on finish preview screen image 510 and document display mode screen image 530.

Edition instructions related to a change of page order, page deletion and page rotation classified as the second type of edition instructions will be specifically described with reference to FIGS. 14 to 16.

—Change of Page Order—

Figure 14:
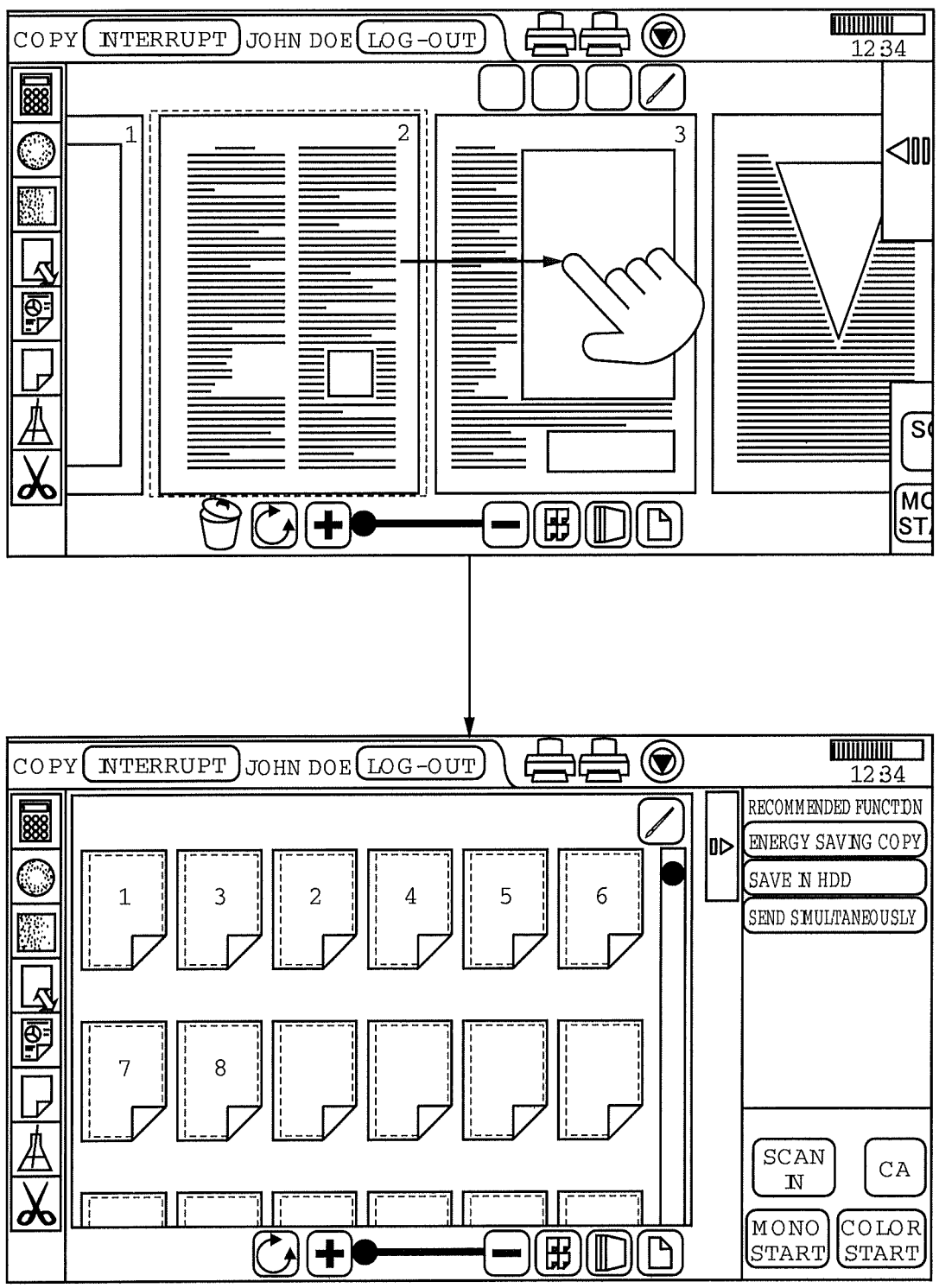
FIG. 14 shows that an edition instruction to change arrangement of page images is reflected on the document display mode screen image.

Referring to FIG. 14, the user touches a page of which arrangement is to be changed, displayed on image edition mode screen image 520, with his/her finger. The dotted line represents that the touched page is focused (selected). Then, the user drags the touched page such that the pages are arranged in the desired order (see the right-pointing arrow). This operation is done on document display data 640. When this operation ends and document display button 452 is pressed, document display mode screen image 530 is displayed with the page order reflecting the page order changing operation. On the screen image on the lower side of FIG. 14, pages with the order of the second and third pages changed are displayed. Naturally, the result of edition is also displayed on finish preview screen image 510.

—Page Deletion—

Referring to FIG. 15, the user touches a page he/she wants to delete, displayed on image edition mode screen image 520, with his/her finger. After confirming selection of the page of interest, the user touches trash bin icon 470. Thus, the page is deleted. The deleting operation may be realized by drag-and-drop of the page to trash bin icon 470. This process is also done on document display data 640. When the deleting operation ends and document display button 452 is pressed, document display mode screen image 530 is displayed reflecting the page deletion operation.

—Page Rotation—

Figure 16:
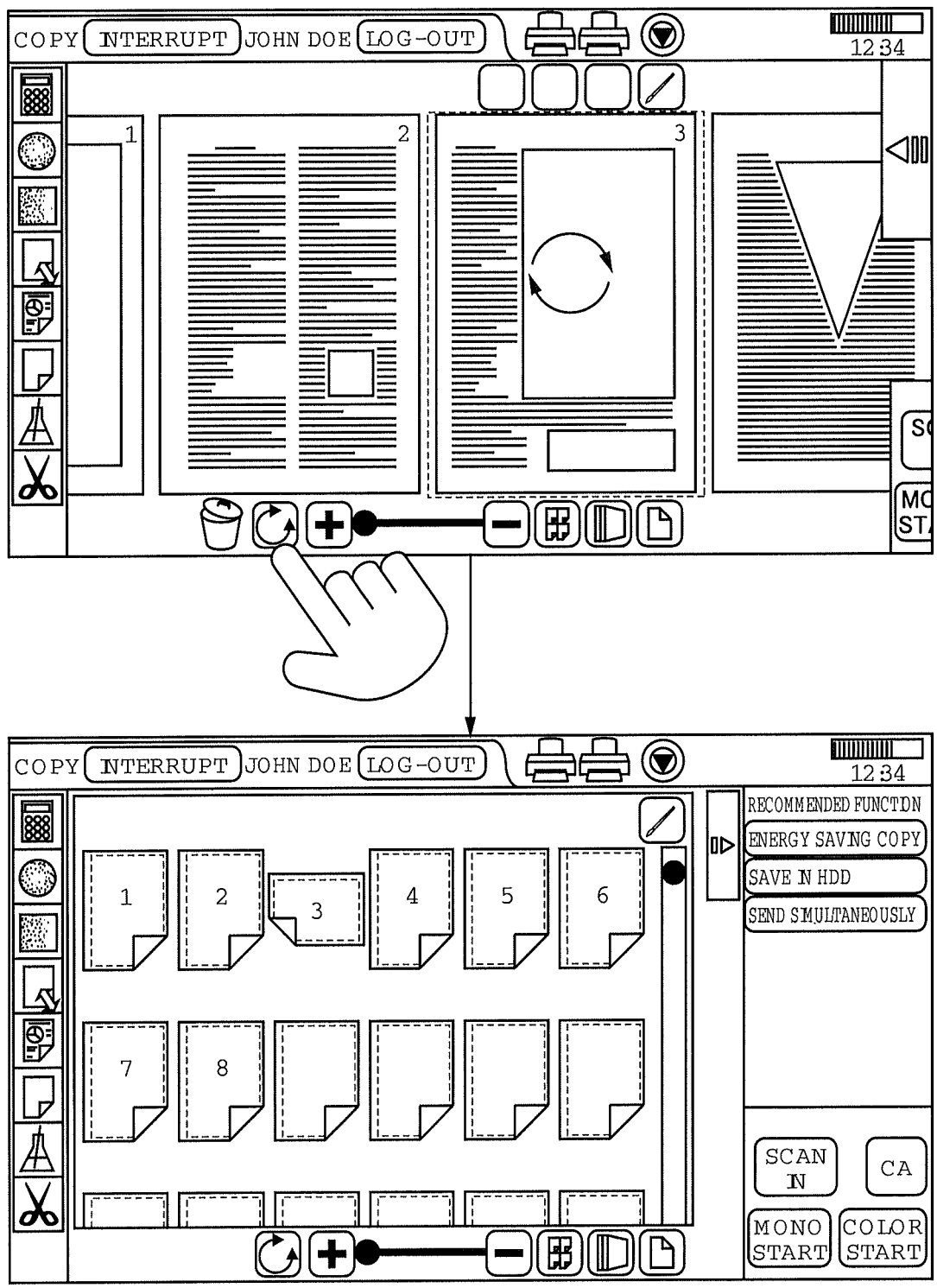
FIG. 16 shows that an edition instruction to rotate a page image is reflected on the document display mode screen image.

Referring to FIG. 16, the user touches a page of which direction of display is to be rotated, displayed on image edition mode screen image 520, with his/her finger. After confirming selection of the page of interest, the user touches rotation button 458. Thus, the display direction of the page rotates. This process is also done on document display data 640. When the rotation operation ends and document display button 452 is pressed, document display mode screen image 530 is displayed reflecting the rotating operation.

Each of the editing operations shown in FIGS. 14 to 16 is also reflected on a display in finish preview screen image 510. Specifically, when an editing operation ends and then finish preview button 454 is pressed, a page image of which the manner of display has been changed by the editing operation is displayed.

Referring to FIG. 10, when the user presses the monochrome copy start button or the color copy start button on task trigger area 484, the contents of instruction are fully reflected on original image data 620, and the document reflecting the editing operation is output.

[Software Configuration]

Figure 17:
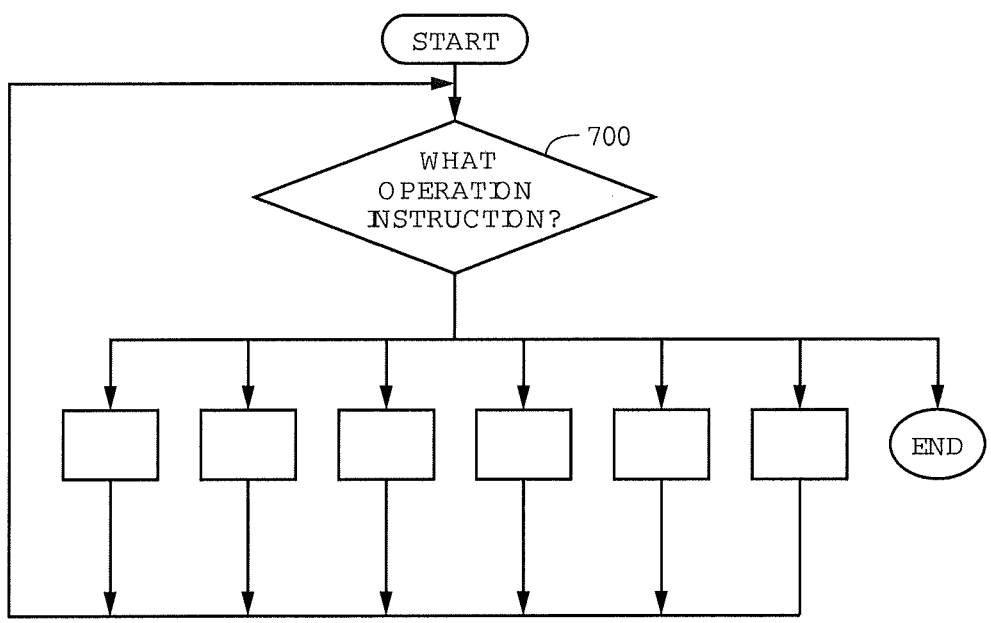
FIG. 17 is a flowchart representing a control structure of a program processing an edition instruction, in an image forming apparatus in accordance with an embodiment of the present invention.
Figure 18:
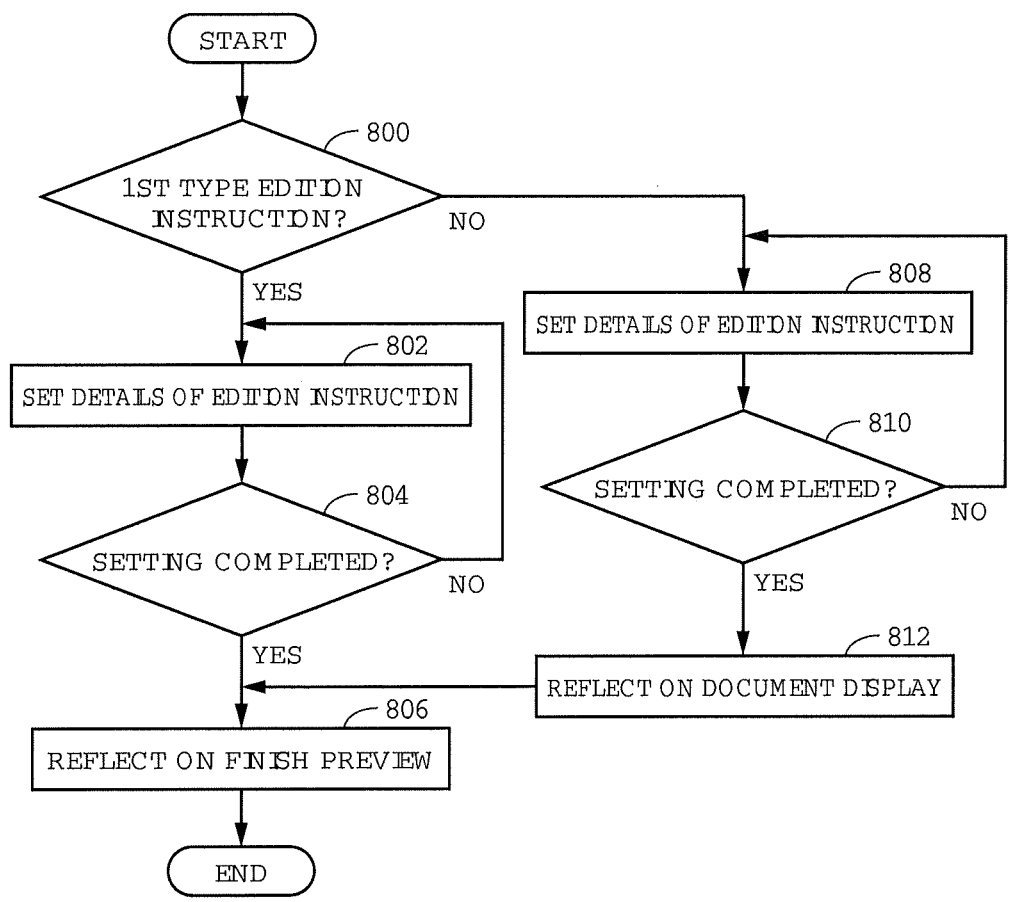
FIG. 18 is a flowchart representing a control structure of a program determining whether or not the instruction is to be reflected on the document display mode screen image, in accordance with the edition instruction, in the image forming apparatus in accordance with an embodiment of the present invention.

Referring to FIGS. 17 and 18, the control structure of a program executed by CPU 300 of image forming apparatus 100 will be described. CPU 300 of image forming apparatus 100 executes, in parallel with such a program, programs for realizing general functions of an image forming apparatus. These programs, however, are not directly related to the essential portion of the present invention and, therefore, details thereof will not be described here.

Referring to FIG. 17, at step 700, CPU 300 waits for an operation instruction from the user, and if an operation instruction is received, determines what the operation instruction is. In accordance with the instruction, process steps taken thereafter will be determined. When each process ends, the control returns to process step 700 to wait for another operation instruction. If the instruction is "to end processing," the program ends.

FIG. 18 shows, in the form of a flowchart, a control structure of a program executing a certain operation instruction of FIG. 17. Though the specific contents of editing process differ instruction by instruction, the program structure is similar. Referring to FIG. 18, at step 800, CPU 300 determines whether or not the edition instruction given by the user is the first type of edition instruction. If it is determined to be the first type of edition instruction, CPU 300 proceeds to step 802, where details of instruction contents are set. At step 804, CPU 300 determined whether or not setting of details has been completed. If the result of determination is positive (YES), the control proceeds to step 806, and the edition instruction is reflected on finish preview screen image 510. If the result of determination is negative (NO), the control returns to step 802.

If the determination at step 800 is negative, CPU 300 proceeds to step 808, and sets details of the instruction contents. At step 810, CPU 300 determines whether or not the setting of details has been completed. If the result of determination is negative, the control returns to step 808. If the result of determination is positive, the control proceeds to step 812, and the contents of edition instruction are reflected on document display mode screen image 530. If the process of step 812 ends, the control proceeds to step 806, where the contents of edition instruction are reflected on finish preview screen image 510.

[Operation]

Image forming apparatus 100 operates in the following manner. In the following, the operation after completion of document display will be described mainly with reference to FIG. 18.

The user has a preview display of page image of the document to be edited, on display 130. In the often used copy mode, when reading of all pages of the document is completed, the screen image is switched to fit-to-screen screen image 500, where the first page of the read image is displayed on preview area 480.

In the preview display, no matter which of fit-to-screen screen image 500, finish preview screen image 510, image edition mode screen image 520 and document display mode screen image 530 is displayed, transition to the corresponding screen image is possible by pressing document display button 452, finish preview button 454, fit-to-screen button 456 or image edition button 468. By the screen image transition, the user can easily compare the page image that is being edited, the finish preview that is in the same form as the output document, the page image immediately after reading the document and the like.

When the user makes an edition operation on a document he/she wants to edit, image forming apparatus 100 determines whether or not the edition instruction is the first type of edition instruction (step 800). If the result of determination is positive, the edition is done only on finish preview data 630, and not on document display data 640. Specifically, though the page image after edition is displayed on finish preview screen image 510 (steps 802, 804, 806), the edition is not reflected on document display mode screen image 530.

If the result of determination at step 800 is negative, when the user confirms completion of edition setting and issues an instruction to image forming apparatus 100, the edition is done both on finish preview data 630 and on document display data 640. Specifically, the page images after edition are displayed on finish preview screen image 510 and document display mode screen image 530 (steps 808, 810, 812, 806).

In this manner, depending on whether the edition instruction is of the first type or second type, whether the editing operation is to be reflected on the page image in the document display mode is determined. If the edition instruction is the first type edition instruction, the display in the document display mode is kept unchanged, so that the user can confirm what the page image was immediately after reading. Therefore, the user can easily confirm how the page image has been changed from immediately after reading to after edition, through the screen image transition.

In the embodiment above, masking operation, collection and monochrome printing are discussed as examples of the first type edition instructions. Change of page order, page deletion and page rotation are discussed as examples of the second type of edition instructions. The present invention, however, is not limited to the embodiment as above. The first type edition instruction may be one that maintains page configuration, and may additionally include post processing of paper such as stapling, punching and margin setting. The second type of edition instruction includes all edition instructions other than the first type of edition instructions and may include, in addition to those mentioned above, insertion of a blank page.

<Modifications>

Figure 19:
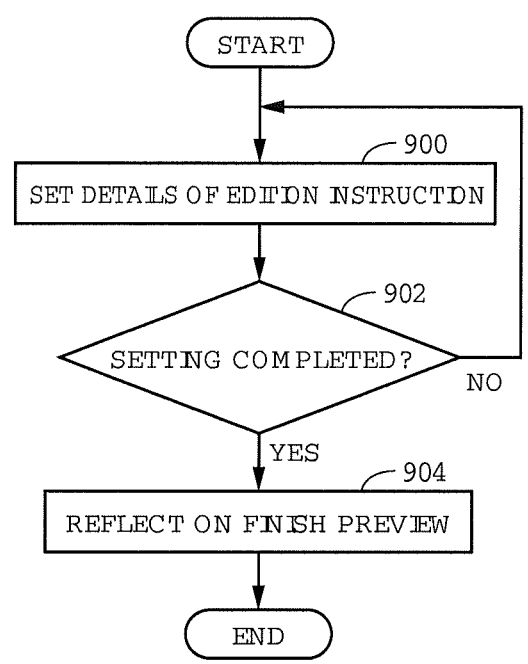
FIG. 19 is a flowchart representing a control structure of a program reflecting an edition instruction on a finish preview screen image, in the image forming apparatus in accordance with an embodiment of the present invention.

The program executed by CPU 300 of image forming apparatus 100 may have a control structure shown in FIGS. 19 and 20. These are effective if it is known in advance whether each instruction is of the first type or the second type. These control structures are different from that of FIG. 18 in that the step of determining whether the edition instruction is of the first type or second type is not included. FIG. 19 represents the structure common to the edition instructions of the first type, and FIG. 20 represents the structure common to the edition instructions of the second type.

(1) Control for the Edition Instruction of the First Type

Referring to FIG. 19, when an edition instruction of the first type is given by the user to image forming apparatus 100, at step 900, CPU 300 sets details of the instruction contents. At step 902, CPU 300 determines whether or not the setting has been completed. If the determination is positive, the control proceeds to step 904, and the instructed edition is executed on finish preview data 630. The result of edition is reflected on finish preview screen image 510. If the result of determination is negative, the control returns to step 900.

(2) Control for the Edition Instruction of the Second Type

Referring to FIG. 20, when an edition instruction of the second type is given by the user to image forming apparatus 100, at step 906, CPU 300 sets details of the instruction contents. At step 908, CPU 300 determines whether or not the setting has been completed. If the determination is positive, the control proceeds to step 910, and if it is negative, the control returns to step 906. At step 910, the instructed edition is executed on finish preview data 630. The result of edition is reflected on finish preview screen image 510. At step 912, the instructed edition is executed on document display data 640. The result of edition is reflected on document display mode screen image 530.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus comprising:
a display; and
a processor; wherein
the processor controls the display to display page images generated from input image data and a preview image of an image to be formed on a recording medium;
the processor receives an editing instruction given on said preview image; and
said editing instruction includes a first type of editing instruction which is not reflected on said page images, and a second type of editing instruction which is reflected on said page images.

2. The image forming apparatus according to claim 1, wherein said second type of editing instruction is an editing instruction that influences at least one of arrangement and a direction of a display of pages of said page images.

3. The image forming apparatus according to claim 1, wherein said first type of editing instruction is an editing instruction that does not influence either arrangement or a direction of a display of pages of said page images.

4. The image forming apparatus according to claim 2, wherein
said second type of editing instruction is at least one of:
an editing instruction to change order of arrangement of pages of said page images displayed on said display,
an editing instruction to delete a designated one of said page images, and
an editing instruction to rotate a designated one of said page images.

5. The image forming apparatus according to claim 1, wherein the processor controls the display to switch between displaying the page images and displaying the preview image in response to a user instruction.

6. A method of displaying information on an image forming apparatus including a display, the method comprising the steps of:

displaying page images generated from input image data;
displaying a preview image of an image to be formed on a recording medium; and
giving an editing instruction on said preview image; wherein
said editing instruction includes a first type of editing instruction which is not reflected on said page images, and a second type of editing instruction which is reflected on said page images.

* * * * *